United States Patent
Takagi et al.

(10) Patent No.: US 11,897,309 B2
(45) Date of Patent: Feb. 13, 2024

(54) VEHICLE HEAT MANAGEMENT SYSTEM

(71) Applicant: SUBARU CORPORATION, Tokyo (JP)

(72) Inventors: Yasushi Takagi, Tokyo (JP); Yoshiyuki Jin, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/726,754

(22) Filed: Apr. 22, 2022

(65) Prior Publication Data

US 2022/0242194 A1 Aug. 4, 2022

Related U.S. Application Data

(62) Division of application No. 16/502,556, filed on Jul. 3, 2019, now abandoned.

(30) Foreign Application Priority Data

Sep. 28, 2018 (JP) .................................. 2018-185260

(51) Int. Cl.
*B60H 1/10* (2006.01)
*B60H 1/00* (2006.01)
*B60H 1/22* (2006.01)

(52) U.S. Cl.
CPC ..... *B60H 1/00278* (2013.01); *B60H 1/00007* (2013.01); *B60H 1/00392* (2013.01);
(Continued)

(58) Field of Classification Search
CPC ............ B60H 1/00278; B60H 1/32284; B60H 1/00007; B60H 1/10
See application file for complete search history.

(56) References Cited

U.S. PATENT DOCUMENTS

| 7,823,671 | B2 | 11/2010 | Inoue et al. |
| 9,573,437 | B2 | 2/2017 | Osaka et al. |

(Continued)

FOREIGN PATENT DOCUMENTS

| JP | 2012154222 A | 8/2012 |
| JP | 2015116872 A | 6/2015 |

(Continued)

OTHER PUBLICATIONS

Translation of Patent Document WO2012084175A1 entitled Translation-WO2012084175A1 (Year: 2023).*

(Continued)

*Primary Examiner* — Paul Alvare
(74) *Attorney, Agent, or Firm* — TROUTMAN PEPPER HAMILTON SANDERS LLP

(57) ABSTRACT

A vehicle heat management system includes a refrigerant circuit, a battery temperature regulation circuit, and an electric part cooling circuit. The refrigerant circuit circulates a refrigerant to regulate a temperature inside a passenger compartment through the refrigerant circuit. The battery temperature regulation circuit regulates a temperature of a battery by introducing a liquid that exchanges heat with the refrigerant to the battery. The electric part cooling circuit circulates a liquid cooled by a radiator circulates through the electric part cooling circuit, and is capable of cooling a first and second pieces for driving a vehicle. In a first mode, the liquid cooled by the radiator cools the first piece of equipment, the refrigerant of the refrigerant circuit cools the second piece of equipment, and the liquid which has exchanged heat with the refrigerant is introduced in parallel to the battery and the second piece of equipment.

7 Claims, 18 Drawing Sheets

(52) U.S. Cl.
CPC ..... *B60H 1/00885* (2013.01); *B60H 1/00907* (2013.01); *B60H 1/10* (2013.01); *B60H 1/2215* (2013.01)

(56) References Cited

U.S. PATENT DOCUMENTS

| | | | |
|---|---|---|---|
| 10,836,233 B2 | 11/2020 | Allgaeuer et al. | |
| 2012/0297805 A1* | 11/2012 | Kamada | B60H 1/32281 |
| | | | 62/208 |
| 2012/0304674 A1 | 12/2012 | Schwarzkopf | |
| 2012/0327596 A1* | 12/2012 | Anderson-Straley | ........................ |
| | | | H01M 10/625 |
| | | | 361/689 |
| 2013/0319029 A1 | 12/2013 | Sekiya et al. | |
| 2014/0096550 A1* | 4/2014 | Gao | B60L 3/0046 |
| | | | 62/126 |
| 2015/0034272 A1* | 2/2015 | Saab | B60H 1/00278 |
| | | | 123/41.31 |
| 2015/0101789 A1* | 4/2015 | Enomoto | B60H 1/039 |
| | | | 236/35 |
| 2017/0021698 A1* | 1/2017 | Hatakeyama | F25B 25/005 |
| 2017/0253105 A1* | 9/2017 | Allgaeuer | B60H 1/143 |
| 2017/0267056 A1 | 9/2017 | Kim et al. | |
| 2018/0065444 A1* | 3/2018 | Allgaeuer | B60H 1/00899 |
| 2018/0072130 A1 | 3/2018 | Kim | |
| 2018/0117991 A1* | 5/2018 | Kim | B60H 1/00899 |
| 2018/0208061 A1 | 7/2018 | Ben Ahmed | |
| 2019/0047369 A1* | 2/2019 | Kim | F25B 21/04 |
| 2019/0070924 A1* | 3/2019 | Mancini | B60H 1/00564 |
| 2019/0135075 A1* | 5/2019 | Hwang | B60H 1/00278 |
| 2019/0366800 A1* | 12/2019 | Durrani | B60H 1/00485 |
| 2019/0375270 A1 | 12/2019 | Boger et al. | |
| 2020/0079177 A1 | 3/2020 | Ferraris et al. | |
| 2020/0101810 A1* | 4/2020 | Takagi | B60L 58/27 |
| 2020/0101816 A1* | 4/2020 | Takagi | B60H 1/00485 |
| 2020/0164719 A1 | 5/2020 | Shiratori et al. | |
| 2020/0189357 A1 | 6/2020 | Chopard et al. | |

FOREIGN PATENT DOCUMENTS

| | | | | |
|---|---|---|---|---|
| JP | 2016-137773 A | 8/2016 | | |
| JP | 2018043741 A | 3/2018 | | |
| WO | WO-2012084175 A1 * | 6/2012 | ........ | B60H 1/00278 |
| WO | 2018069629 A1 | 4/2018 | | |

OTHER PUBLICATIONS

Office Action with Machine Translation dated Jun. 21, 2022 in Japanese Patent Application No. 2018-185260; 6 pages.

* cited by examiner

VEHICLE HEAT MANAGEMENT SYSTEM

CROSS-REFERENCE TO RELATED APPLICATIONS

The present application is a divisional application of U.S. patent application Ser. No. 16/502,556 filed on Jul. 3, 2019, which claims priority from Japanese Patent Application No. 2018-185260 filed on Sep. 28, 2018, the entire contents of which are hereby incorporated by reference.

BACKGROUND

The disclosure relates to a vehicle heat management system.

In the related art, Japanese Unexamined Patent Application Publication No. 2016-137773 relates to a system configuration of a vehicular air conditioning device of an electric vehicle, and describes that a battery cycle and a refrigeration cycle (air conditioning) exchange heat, additionally that a three-way valve is formed between the battery cycle and a power module cycle, and that temperature regulation is performed.

SUMMARY

An aspect of the disclosure provides a vehicle heat management system including a refrigerant circuit, a battery temperature regulation circuit, and an electric part cooling circuit. The refrigerant circuit is configured to circulate a refrigerant to regulate a temperature inside a passenger compartment through the refrigerant circuit. The battery temperature regulation circuit is configured to regulate a temperature of a battery by introducing a liquid that exchanges heat with the refrigerant to the battery. The electric part cooling circuit is configured to circulate a liquid cooled by a radiator through the electric part cooling circuit. The electric part cooling circuit is capable of cooling a first piece of equipment and a second piece of equipment for driving a vehicle. In a first mode, the liquid cooled by the radiator cools the first piece of equipment, the refrigerant of the refrigerant circuit cools the second piece of equipment, and the liquid which has exchanged heat with the refrigerant is introduced in parallel to the battery and the second piece of equipment.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
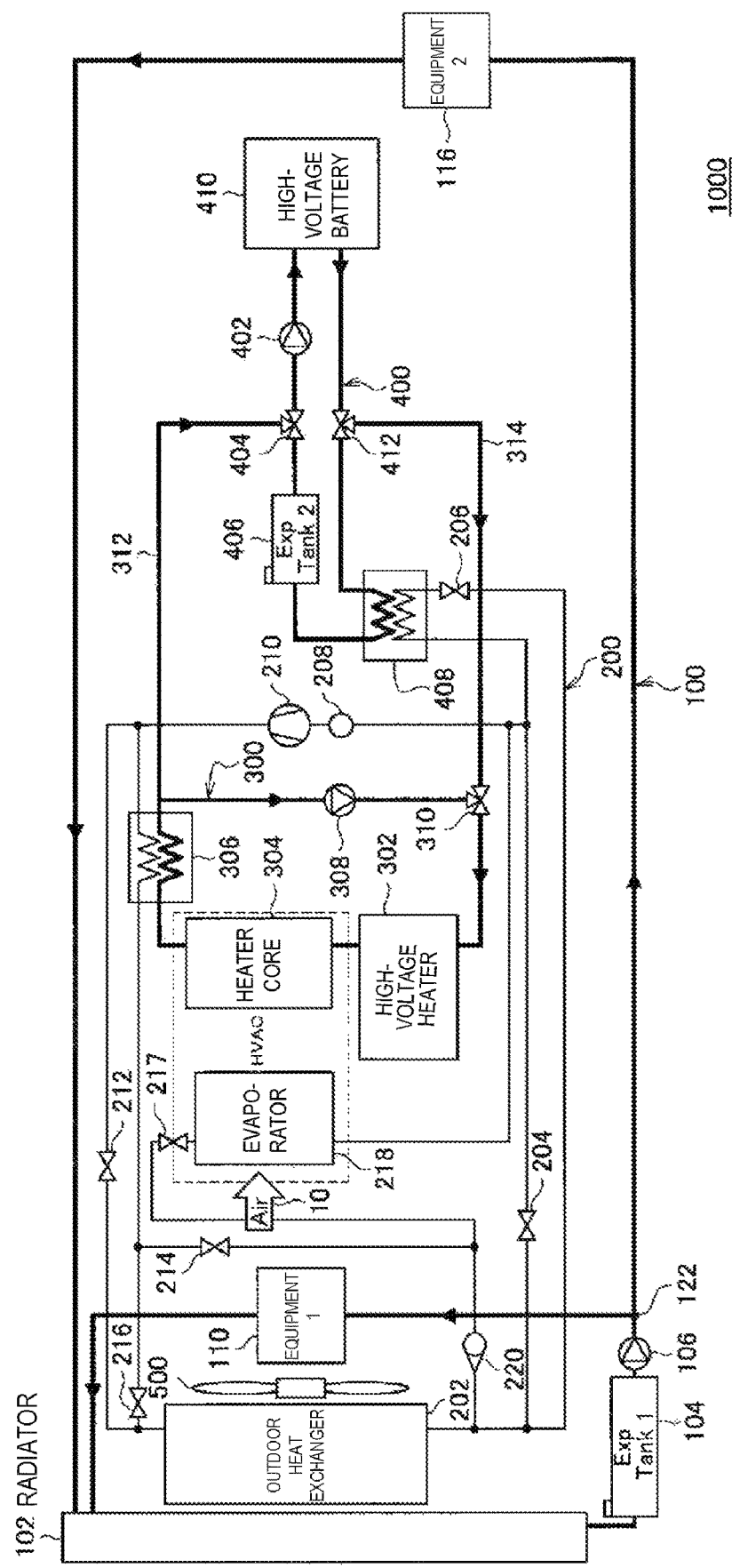
FIG. 1 is a schematic diagram illustrating a schematic configuration of a vehicle heat management system according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In the technology described in JP-A No. 2016-137773 above, since only the simple exchange of heat is executed between the battery cycle and the refrigeration cycle, under conditions in which the temperature of the refrigerant cannot be controlled optimally because of the outdoor air temperature or the like for example, it is difficult to bring the battery temperature to a suitable temperature. Further, in an electric vehicle, since the amount of generated heat and the demanded temperature of a high-voltage part to be cooled is lower than an ordinary vehicle using an internal combustion engine, it becomes more difficult to create a temperature difference in the heat exchanger. Also, for heating, since an internal combustion engine to act as a heat source does not exist in an electric vehicle, and a sufficient amount of heat is not obtained from the waste heat of the high-voltage part, it is necessary to provide separate devices for generating heat, and the efficiency of these devices greatly influences the energy efficiency. For this reason, in the case in which multiple objects of temperature adjustment exist, multiple devices needed for cooling and heating also become necessary, and control also becomes more complicated, leading to increased cost and weight of the vehicle.

Furthermore, if the cooling circuit is configured using a radiator, since the water temperature cannot be lowered past the outdoor air temperature, there is a problem of being unable to ensure the desired cooling capacity depending on the outdoor air temperature. In particular, if cooling is insufficient for a high-voltage part such as the motor that drives the vehicle, the driving force of the vehicle will be insufficient, and there is a possibility that a situation will occur in which the vehicle is unable to exhibit desired performance. On the other hand, in the case of cooling a high-voltage part using a refrigerant function such as air conditioning, there is a possibility that the cooling capacity for air conditioning will be insufficient.

It is desirable to provide a novel and improved vehicle heat management system capable of optimally cooling high-voltage parts that require cooling.

First, FIG. 1 will be referenced to describe a schematic configuration of a heat management system 1000 of a vehicle according to an embodiment of the disclosure. The heat management system 1000 is installed in a vehicle such as an electric vehicle. As illustrated in FIG. 1, the heat management system 1000 includes a power electronics cooling circuit 100, a refrigerant circuit 200, a heating circuit 300, and a battery temperature regulation circuit 400. In the heat management system 1000, the regulation of the temperature inside the passenger compartment and the regulation of the temperature of the battery for driving the vehicle are realized by the combination of the power electronics cooling circuit 100, the refrigerant circuit 200, the heating circuit 300, and the battery temperature regulation circuit 400.

The power electronics cooling circuit 100 is coupled to power electronics for driving the vehicle, and cools these power electronics. Specifically, the power electronics cooling circuit 100 is coupled to a first piece of equipment 110. Also, the power electronics cooling circuit 100 is coupled to a radiator 102, an expansion tank 104, and a water pump 106. For example, the first piece of equipment 110 includes the driving motor of the vehicle, an inverter, a converter, or the like, and a second piece of equipment 116 includes the driving motor of the vehicle, an inverter, a converter, or the like.

A liquid (long life coolant (LLC)) flows through the power electronics cooling circuit 100. In FIG. 1, when a cooling fan 500 rotates, air produced by the cooling fan 500 hits the outdoor heat exchanger 202 of the refrigerant circuit 200 and the radiator 102. Note that while the vehicle is traveling, drag wind also hits the outdoor heat exchanger 202 and the radiator 102. With this arrangement, heat exchange is performed in the radiator 102, and the liquid passing through the radiator 102 is cooled.

As illustrated in FIG. 1, in the power electronics cooling circuit 100, liquid flows in the direction of the arrows according to the action of the water pump 106. The expansion tank 104 provided on the upstream side of the water pump 106 temporarily stores liquid and has a function of separating gas and liquid fluid.

The liquid flowing through the power electronics cooling circuit 100 is divided in two directions at a branch 122 and supplied to each of the first piece of equipment 110 and the second piece of equipment 116. With this arrangement, the first piece of equipment 110 and the second piece of equipment 116 are cooled. The liquid flowing through the power electronics cooling circuit 100 is returned to the radiator 102.

The refrigerant circuit 200 is coupled to an outdoor heat exchanger 202, a low-voltage solenoid valve 204, a chiller expansion valve 206, an accumulator 208, a motorized compressor 210, a water-cooled condenser bypass solenoid valve 212, a high-voltage solenoid valve 214, a heating solenoid valve 216, a cooling expansion valve 217, an evaporator 218, a check valve 220, a water-cooled condenser 306, and a chiller 408.

When a cooling fan 500 rotates, air produced by the cooling fan 500 hits the outdoor heat exchanger 202 of the refrigerant circuit 200. With this arrangement, heat is exchanged at the outdoor heat exchanger 202, and refrigerant flowing through the outdoor heat exchanger 202 is cooled.

Also, as illustrated in FIG. 1, in the refrigerant circuit 200, refrigerant flows in the direction of the arrows according to the action of the motorized compressor 210. The accumulator 208 provided on the upstream side of the motorized compressor 210 has a function of separating gas and liquid refrigerant.

In the refrigerant circuit 200, refrigerant compressed by the motorized compressor 210 is cooled by the outdoor heat exchanger 202, and by being injected into the evaporator 218 by the cooling expansion valve 217, the refrigerant gasifies and cools the evaporator 218. Subsequently, air 10 sent to the evaporator 218 is cooled, and by introducing this air 10 into the passenger compartment, the passenger compartment is cooled. The refrigerant circuit 200 principally cools, dehumidifies, and heats the passenger compartment.

Additionally, in the embodiment, the refrigerant circuit 200 also regulates the temperature of a high-voltage battery 410. The regulation of the temperature of the high-voltage battery 410 by the refrigerant circuit 200 will be described in detail later.

The heating circuit 300 is coupled to a high-voltage heater 302, a heater core 304, the water-cooled condenser 306, a water pump 308, and a three-way valve 310. Also, the heating circuit 300 is coupled to three-way valves 404 and 412 of the battery temperature regulation circuit 400 via channels 312 and 314. The heating circuit 300 principally heats the passenger compartment. Additionally, in the embodiment, the heating circuit 300 also regulates the temperature of the high-voltage battery 410.

In the heating circuit 300, a liquid (LLC) for heating flows. The liquid flows in the direction of the arrows according to the action of the water pump 308. When the high-voltage heater 302 acts, the liquid is warmed by the high-voltage heater 302. The air 10 sent to the evaporator 218 hits the heater core 304. The air 10 sent to the evaporator 218 is warmed by the heater core 304 and introduced into the passenger compartment. With this arrangement, the passenger compartment is heated. The evaporator 218 and the heater core 304 may also be configured as a singular device.

The water-cooled condenser 306 exchanges heat between the heating circuit 300 and the refrigerant circuit 200. The regulation of the temperature of the high-voltage battery 410 by the heating circuit 300 will be described in detail later.

The battery temperature regulation circuit 400 is coupled to a water pump 402, the three-way valve 404, an expansion tank 406, the chiller 408, the high-voltage battery 410, and the three-way valve 412. The battery temperature regulation circuit 400 regulates the temperature of the high-voltage battery 410.

In the battery temperature regulation circuit 400, a liquid (LLC) for regulating the temperature of the high-voltage battery 410 flows. The liquid flows in the direction of the arrows according to the action of the water pump 402. The liquid is introduced into the chiller 408. The chiller 408 exchanges heat between the liquid flowing through the battery temperature regulation circuit 400 and the refrigerant flowing through the refrigerant circuit 200. The expansion tank 406 is a tank that temporarily stores liquid.

As described above, the battery temperature regulation circuit 400 also regulates the temperature of the high-voltage battery 410. The regulation of the temperature of the high-voltage battery 410 by the battery temperature regulation circuit 400 will be described in detail later.

When the temperature of the high-voltage battery 410 rises moderately, the electric power generated by the high-voltage battery 410 increases. In the embodiment, by regulating the temperature of the high-voltage battery 410 with the refrigerant circuit 200 and the heating circuit 300, it is possible to regulate the temperature of the high-voltage battery 410 optimally and cause the high-voltage battery 410 to exhibit high output. For example, when starting the vehicle in the winter or the like, since the high-voltage battery 410 is cold, it may not be possible to exhibit sufficient output in some cases. Also, when charging the high-voltage battery 410, the high-voltage battery 410 generates heat, and the temperature of the high-voltage battery 410 may rise excessively in some cases. Likewise in such cases, by regulating the temperature of the high-voltage battery 410 with the refrigerant circuit 200 and the heating circuit 300, it is possible to regulate the temperature of the high-voltage battery 410 optimally. Note that the regulation of the temperature of the high-voltage battery 410 preferably is executed according to a feedback control based on a measured value of the temperature of the high-voltage battery 410.

Next, the operations of the heat management system 1000 configured as above will be described. To cool, dehumidify, and heat the passenger compartment and also to regulate the temperature of the high-voltage battery 410, various types of heat exchange are performed. In the following, these operations in the heat management system will be described. Note that each operation is merely an example, and the control for achieving each operation is not limited to what is given as an example. In the following description, the operating states of the low-voltage solenoid valve 204, the chiller expansion valve 206, the water-cooled condenser bypass solenoid valve 212, the high-voltage solenoid valve 214, the heating solenoid valve 216, the three-way valve 310, the three-way valve 404, and the three-way valve 412 will be illustrated in the diagrams as solid white to denote the open state and as solid black to denote the closed state.

Figure 2:
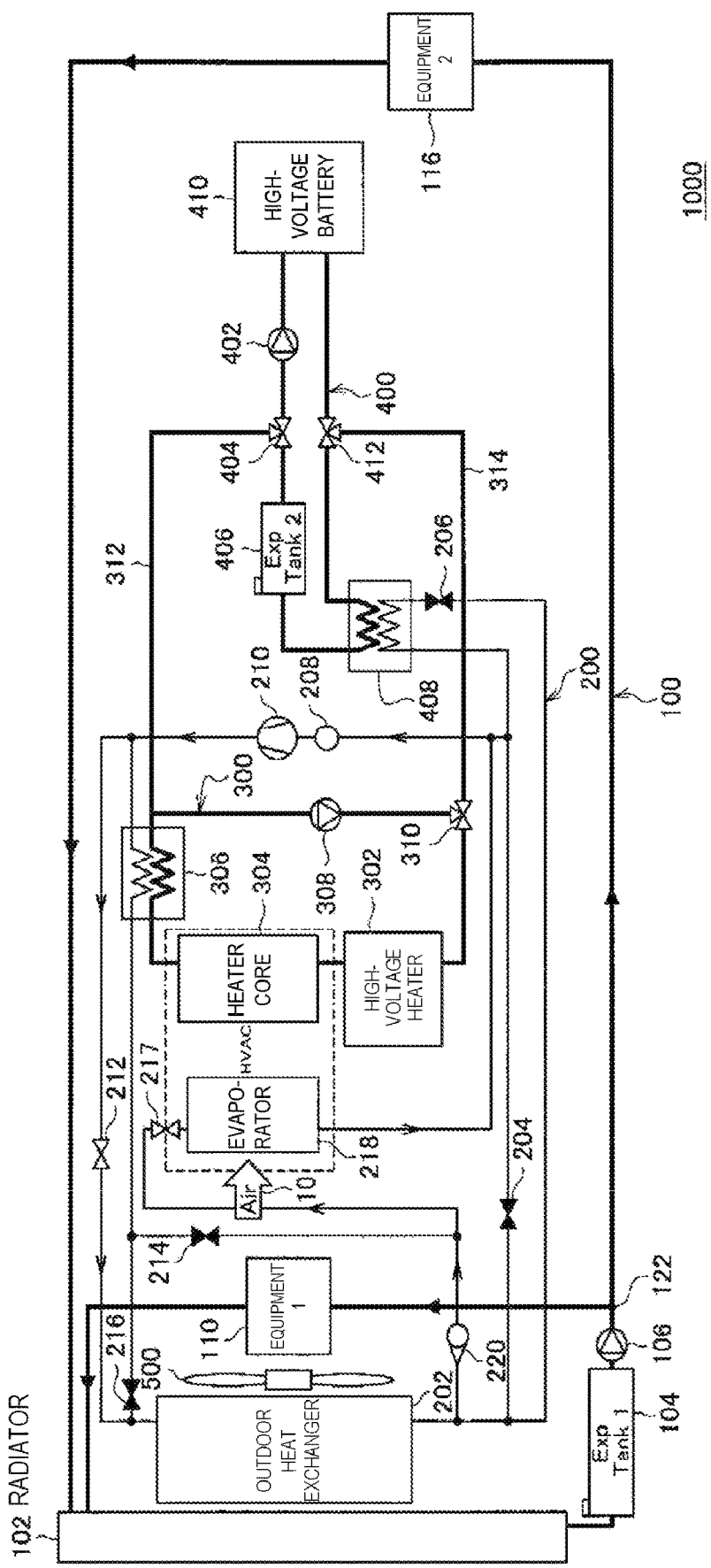
FIG. 2 is a schematic diagram illustrating operations when cooling a passenger compartment.

FIG. 2 is a schematic diagram illustrating operations when cooling the passenger compartment. Cooling of the passenger compartment is performed by the refrigerant circuit 200. FIG. 2 illustrates a state in which the heating circuit 300 and the battery temperature regulation circuit 400 are stopped. The refrigerant in the refrigerant circuit 200 flows in the direction indicated by the arrows in FIG. 2. As described above, air 10 sent to the evaporator 218 is cooled by the evaporator 218, and by introducing this air 10 into the passenger compartment, the passenger compartment is cooled.

2.2. Cooling High-Voltage Battery

Figure 3:
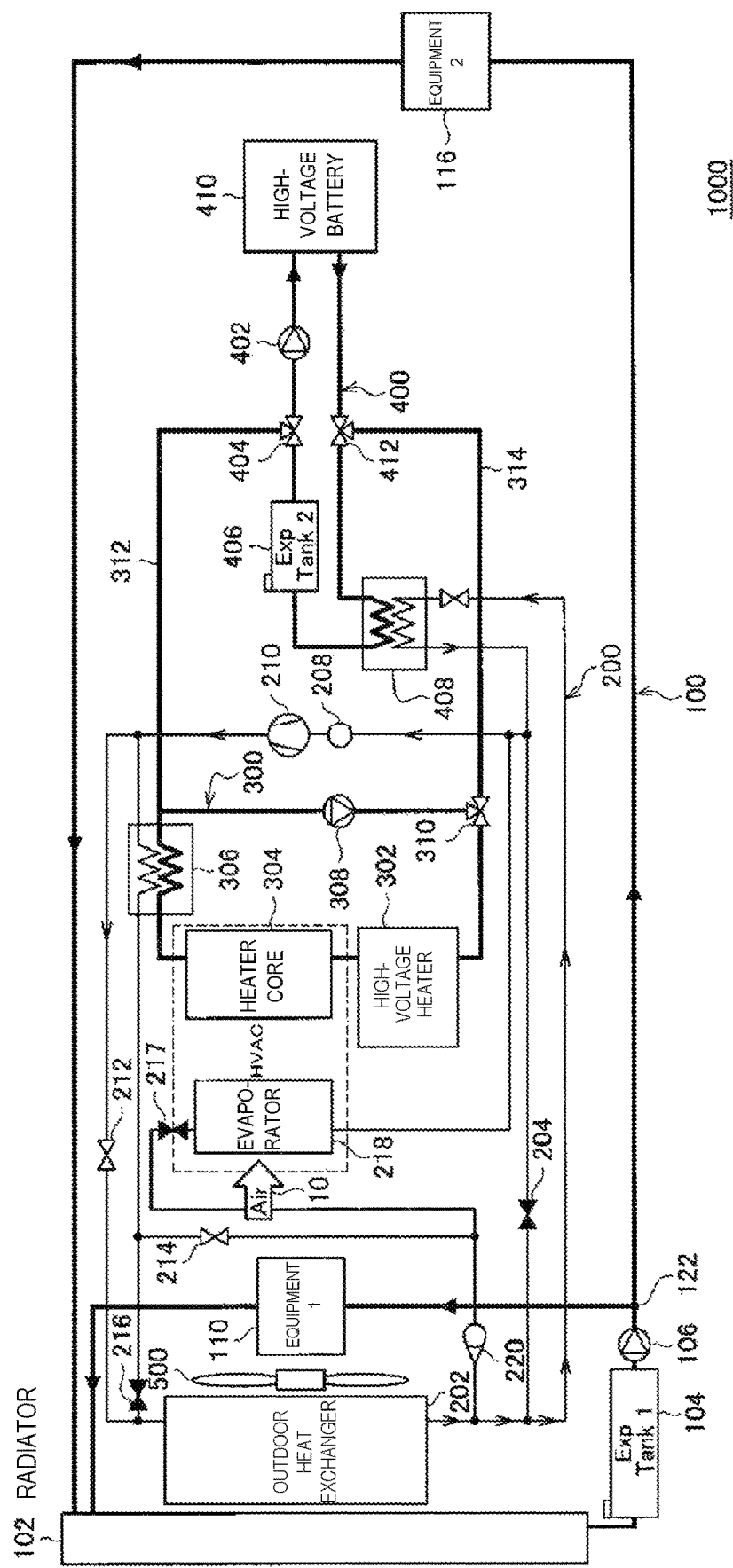
FIG. 3 is a schematic diagram illustrating operations when cooling a high-voltage battery.

FIG. 3 is a schematic diagram illustrating operations when cooling the high-voltage battery 410. In FIG. 3, the cooling of the high-voltage battery 410 is achieved by causing the refrigerant flowing through the refrigerant circuit 200 and the liquid flowing through the battery temperature regulation circuit 400 to exchange heat with each other in the chiller 408. Refrigerant compressed by the motorized compressor 210 is cooled by the outdoor heat exchanger 202, and by being injected into the chiller 408 by the chiller expansion valve 206, the refrigerant gasifies and cools the chiller 408. With this arrangement, the liquid flowing through the battery temperature regulation circuit 400 is cooled by the refrigerant flowing through the refrigerant circuit 200. FIG. 3 illustrates a state in which the heating circuit 300 is stopped.

Figure 4:
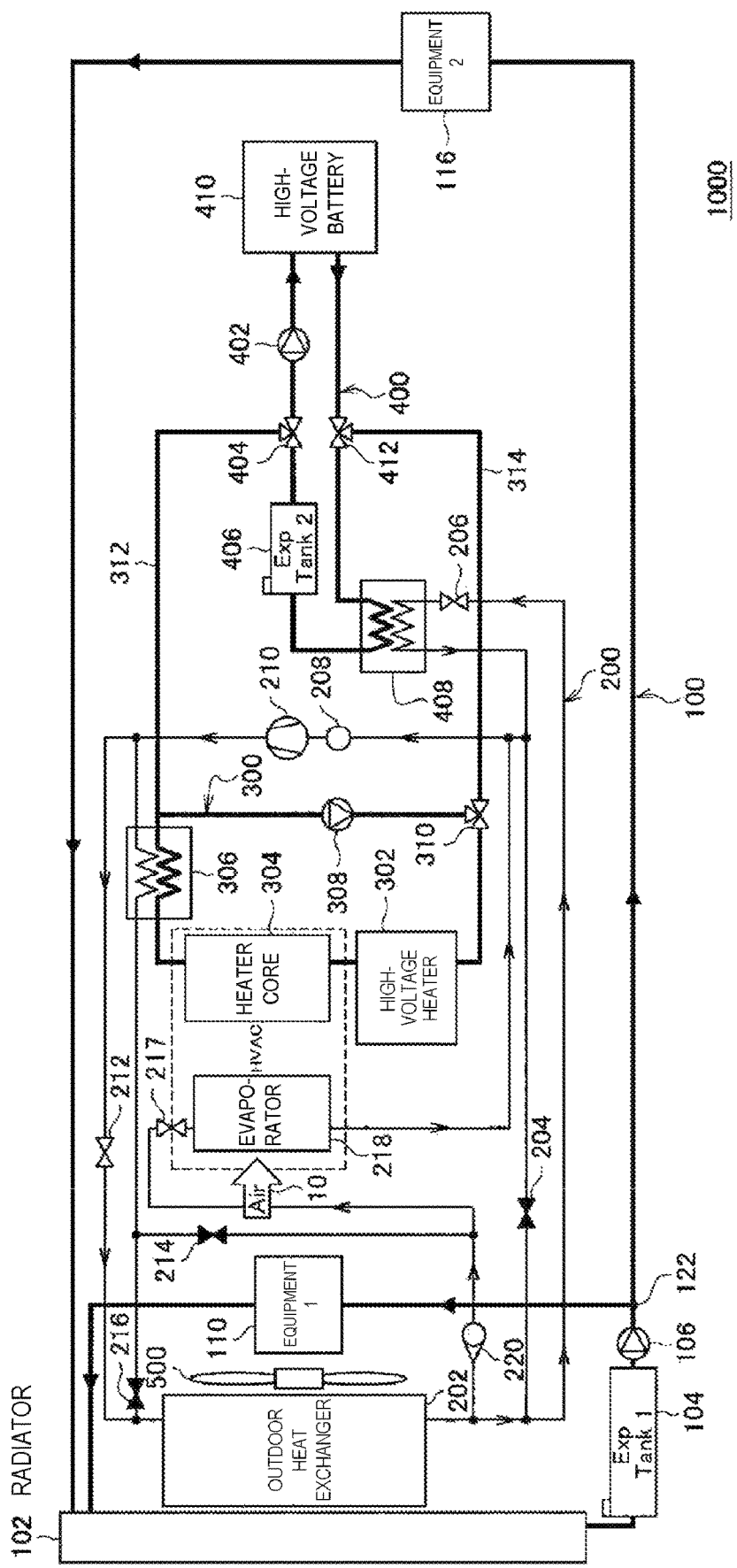
FIG. 4 is a schematic diagram illustrating operations in a case of both cooling the passenger compartment and also cooling the high-voltage battery.

FIG. 4 is a schematic diagram illustrating operations in a case of both cooling the passenger compartment and also cooling the high-voltage battery 410. By opening the chiller expansion valve 206 with respect to FIG. 2, the refrigerant flowing through the refrigerant circuit 200 and the liquid flowing through the battery temperature regulation circuit 400 exchange heat with each other in the chiller 408, and the high-voltage battery 410 is cooled. FIG. 4 illustrates a state in which the heating circuit 300 is stopped.

Figure 5:
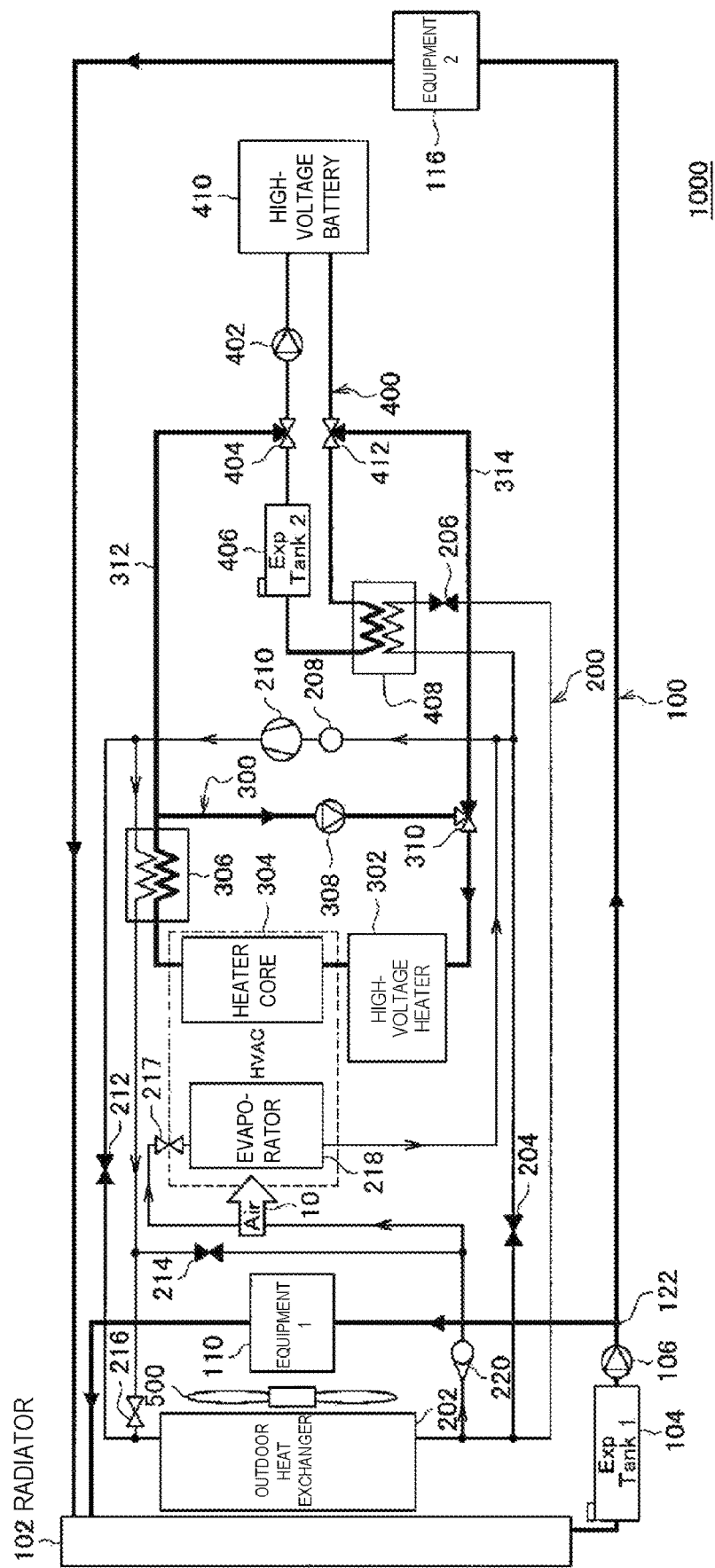
FIG. 5 is a schematic diagram illustrating operations when dehumidifying the passenger compartment.

FIG. 5 is a schematic diagram illustrating operations when dehumidifying the passenger compartment. FIG. 5 differs from FIG. 2 in that air that has been cooled and dehumidified by the evaporator 218 is reheated by the heater core 304. The refrigerant after exchanging heat in the evaporator 218 is in a high-temperature, high-pressure state. By causing liquid to flow through the heating circuit 300 by the action of the water pump 308 and causing the liquid in the heating circuit 300 to exchange heat with the high-temperature, high-pressure refrigerant at the water-cooled condenser 306, the liquid in the heating circuit 300 is heated. At this time, as illustrated in FIG. 5, by closing parts of the three-way valve 310, the three-way valve 404, and the three-way valve 412, the liquid in the heating circuit 300 does not flow into the battery temperature regulation circuit 400. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

Figure 6:
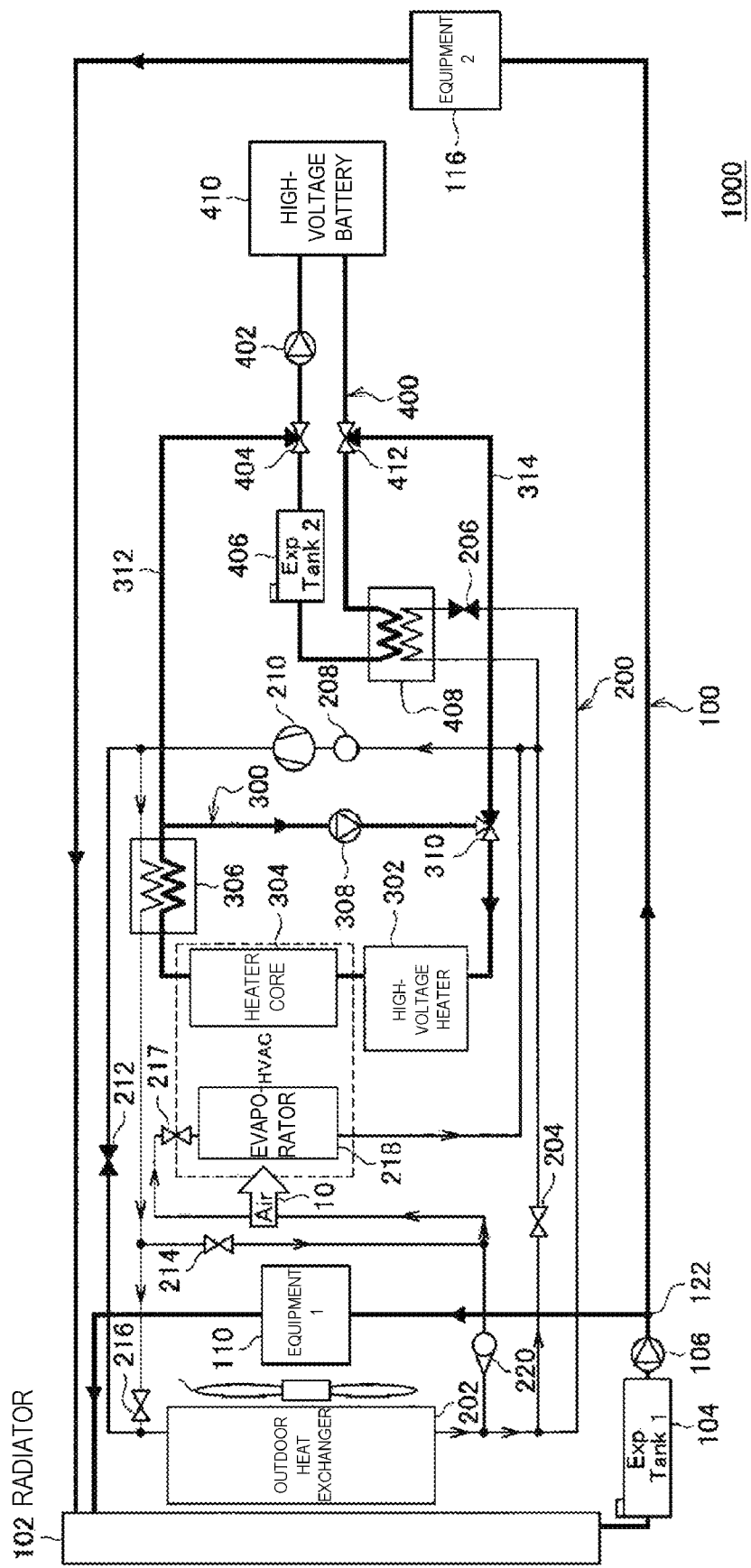
FIG. 6 is a schematic diagram illustrating operations when both dehumidifying and also heating the passenger compartment.

FIG. 6 is a schematic diagram illustrating operations when both dehumidifying and also heating the passenger compartment. In FIG. 6, a portion of the refrigerant in the refrigerant circuit 200 does not pass through the outdoor heat exchanger 202, and instead passes through the high-voltage solenoid valve 214 and is introduced into the evaporator 218. Liquid flows inside the heating circuit 300 by the action of the water pump 308, and the liquid flowing through the heating circuit 300 is warmed by the water-cooled condenser 306. With this arrangement, the air dehumidified by the evaporator 218 is warmed by the heater core 304 and introduced into the passenger compartment.

Figure 7:
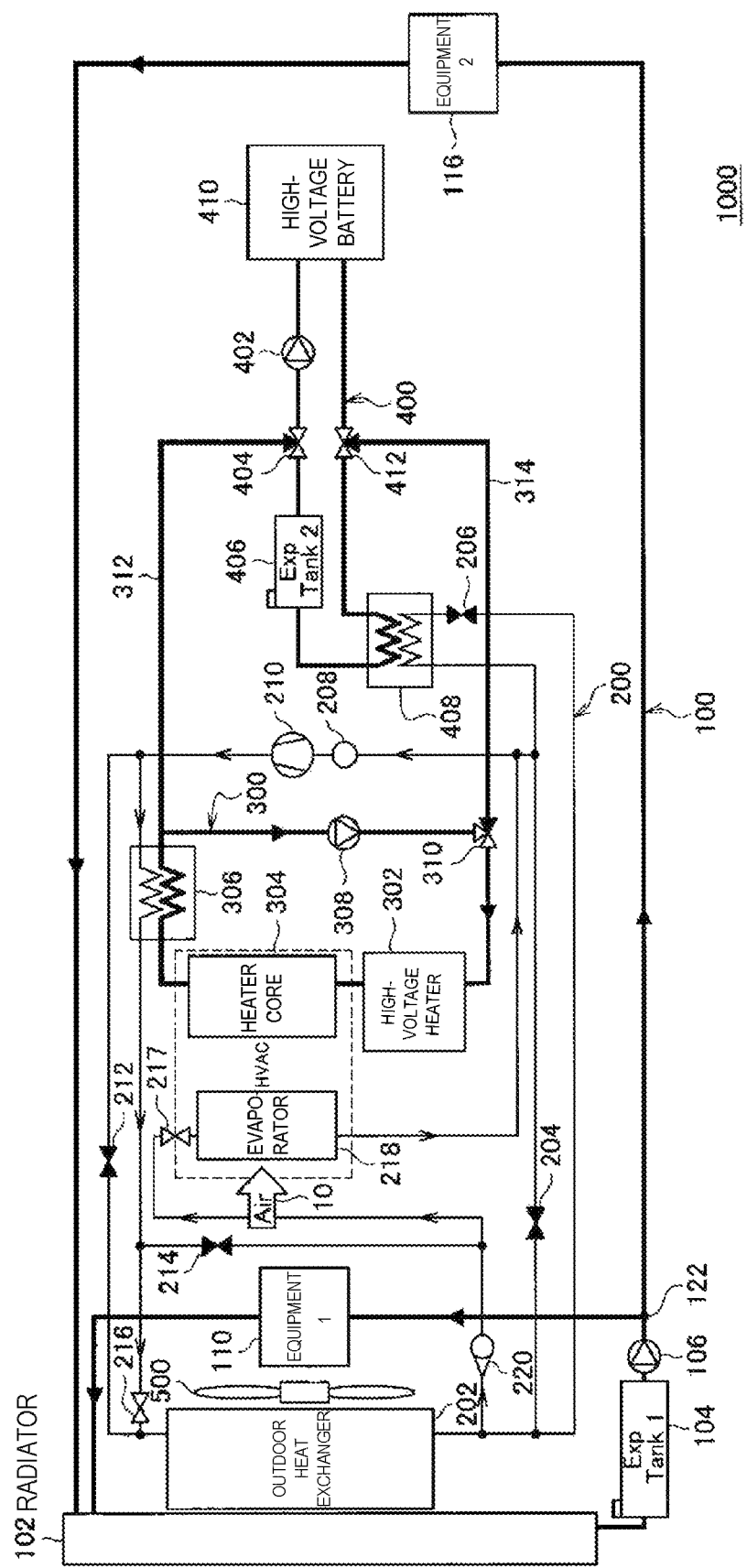
FIG. 7 is a schematic diagram illustrating a different example of operations when both dehumidifying and also heating the passenger compartment.

FIG. 7 is a schematic diagram illustrating a different example of operations when both dehumidifying and also heating the passenger compartment. The basic operations are similar to FIG. 6, but in FIG. 7, the high-voltage solenoid valve 214 and the low-voltage solenoid valve 204 are closed. The difference between FIGS. 6 and 7 is that, in FIG. 7, in the case in which the outdoor air temperature is low, the high-voltage heater 302 is turned on to ensure heating capacity when dehumidifying. On the other hand, in FIG. 6, in the case in which the outdoor air temperature is low, since the refrigerant bypasses the outdoor heat exchanger 202, it is possible to ensure heating capacity even without using the high-voltage heater 302. Note that, similarly to FIG. 5, FIGS. 6 and 7 illustrate a state in which the flow of liquid from the heating circuit 300 to the battery temperature regulation circuit 400 is stopped, and the battery temperature regulation circuit 400 is stopped.

Figure 8:
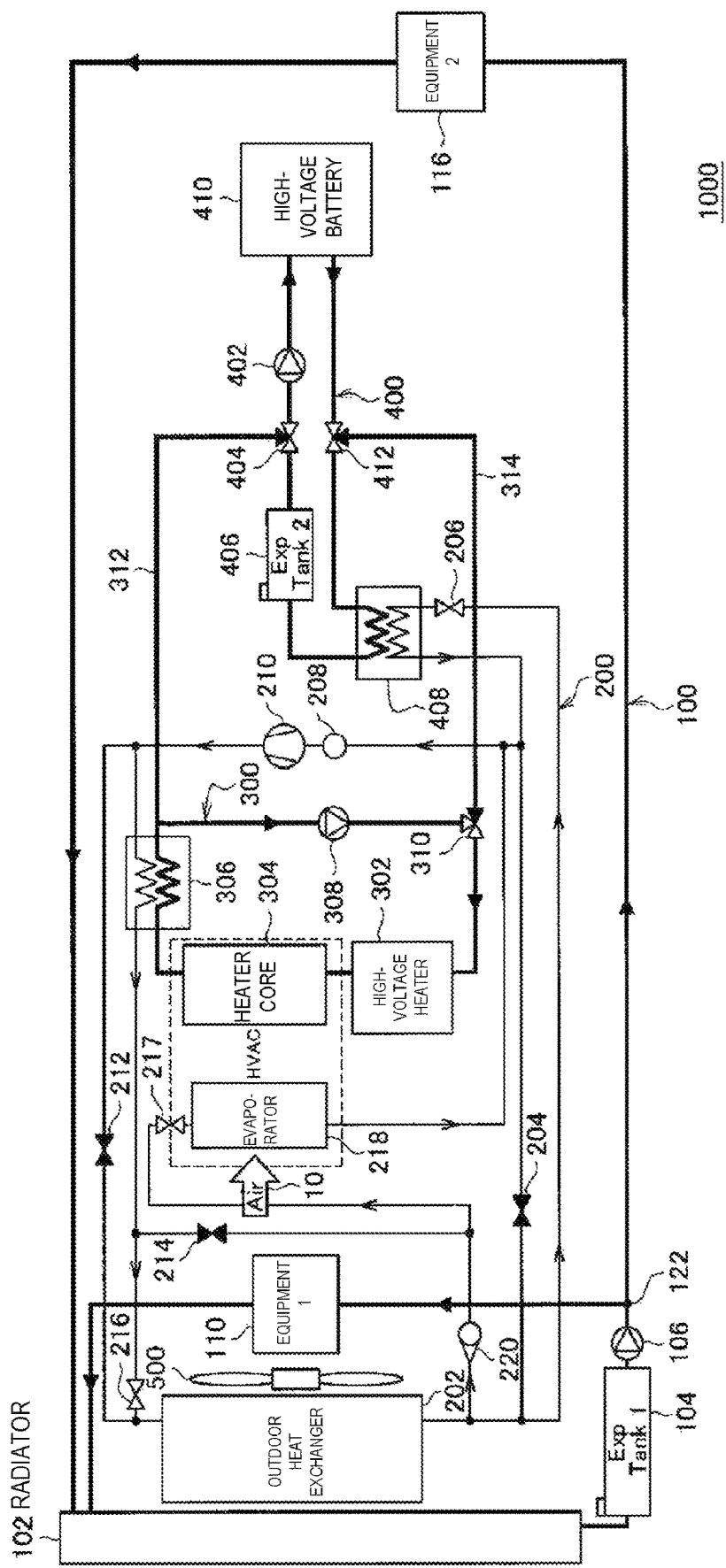
FIG. 8 is a schematic diagram illustrating the operations of both dehumidifying the passenger compartment and also cooling the high-voltage battery.

FIG. 8 is a schematic diagram illustrating the operations of both dehumidifying the passenger compartment and also cooling the high-voltage battery 410. With respect to FIG. 5, the chiller expansion valve 206 is opened. Refrigerant compressed by the motorized compressor 210 is cooled by the outdoor heat exchanger 202, and by being injected into the chiller 408 by the chiller expansion valve 206, the refrigerant gasifies and cools the chiller 408. The refrigerant flowing through the refrigerant circuit 200 and the liquid flowing through the battery temperature regulation circuit 400 exchange heat with each other in the chiller 408, and the high-voltage battery 410 is cooled. Dehumidification is performed similarly to FIG. 5.

Figure 9:
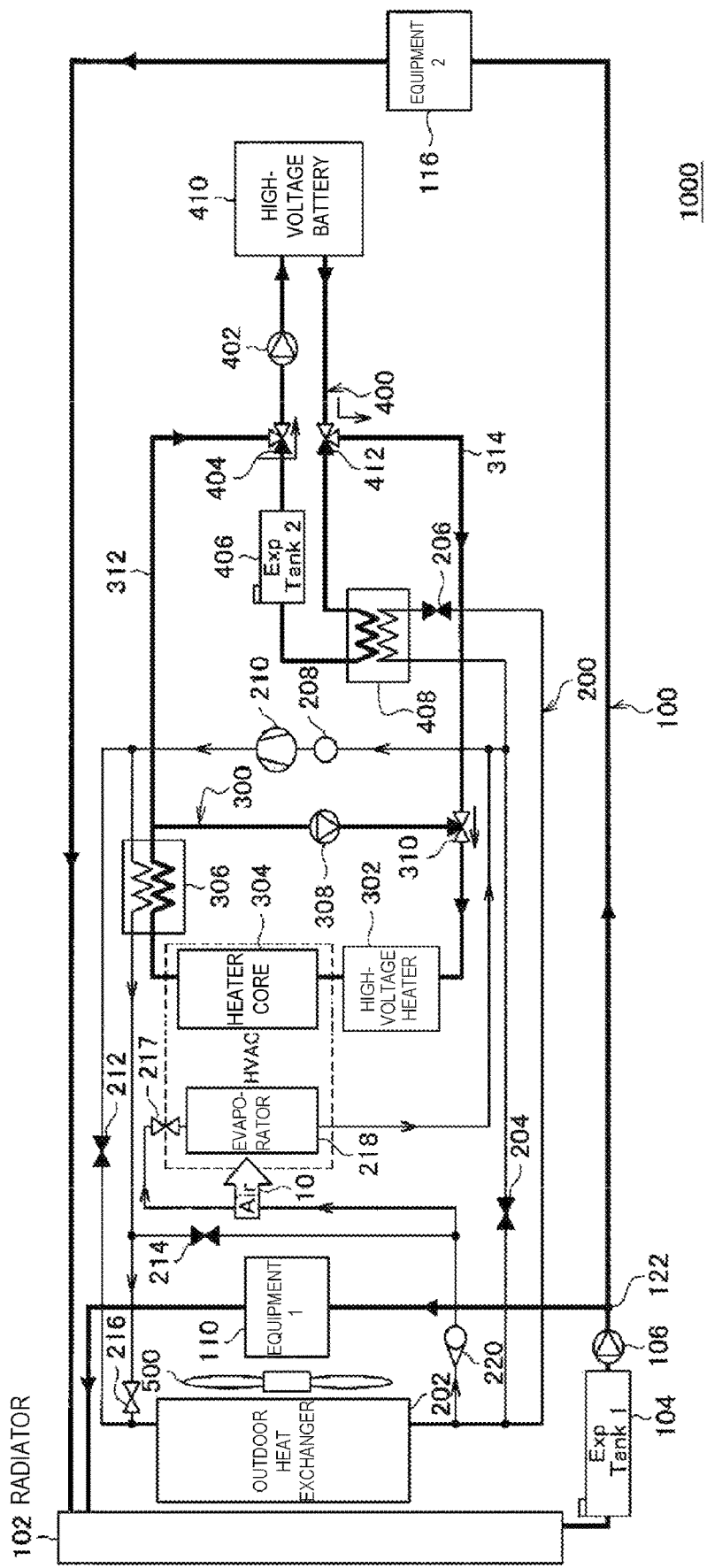
FIG. 9 is a schematic diagram illustrating the operations of both dehumidifying the passenger compartment and also warming up the high-voltage battery.

FIG. 9 is a schematic diagram illustrating the operations of both dehumidifying the passenger compartment and also warming up the high-voltage battery 410. The basic operations are similar to FIG. 5, but in FIG. 9, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402. By introducing the liquid in the heating circuit 300 into the battery temperature regulation circuit 400, it is possible to warm up the high-voltage battery 410. The air dehumidified by the evaporator 218 is warmed by the heater core 304 and introduced into the passenger compartment. In conditions in which the liquid in the heating circuit 300 is not given enough heat from the refrigerant, the high-voltage heater 302 is turned on to heat the liquid in the heating circuit 300 further.

Figure 10:
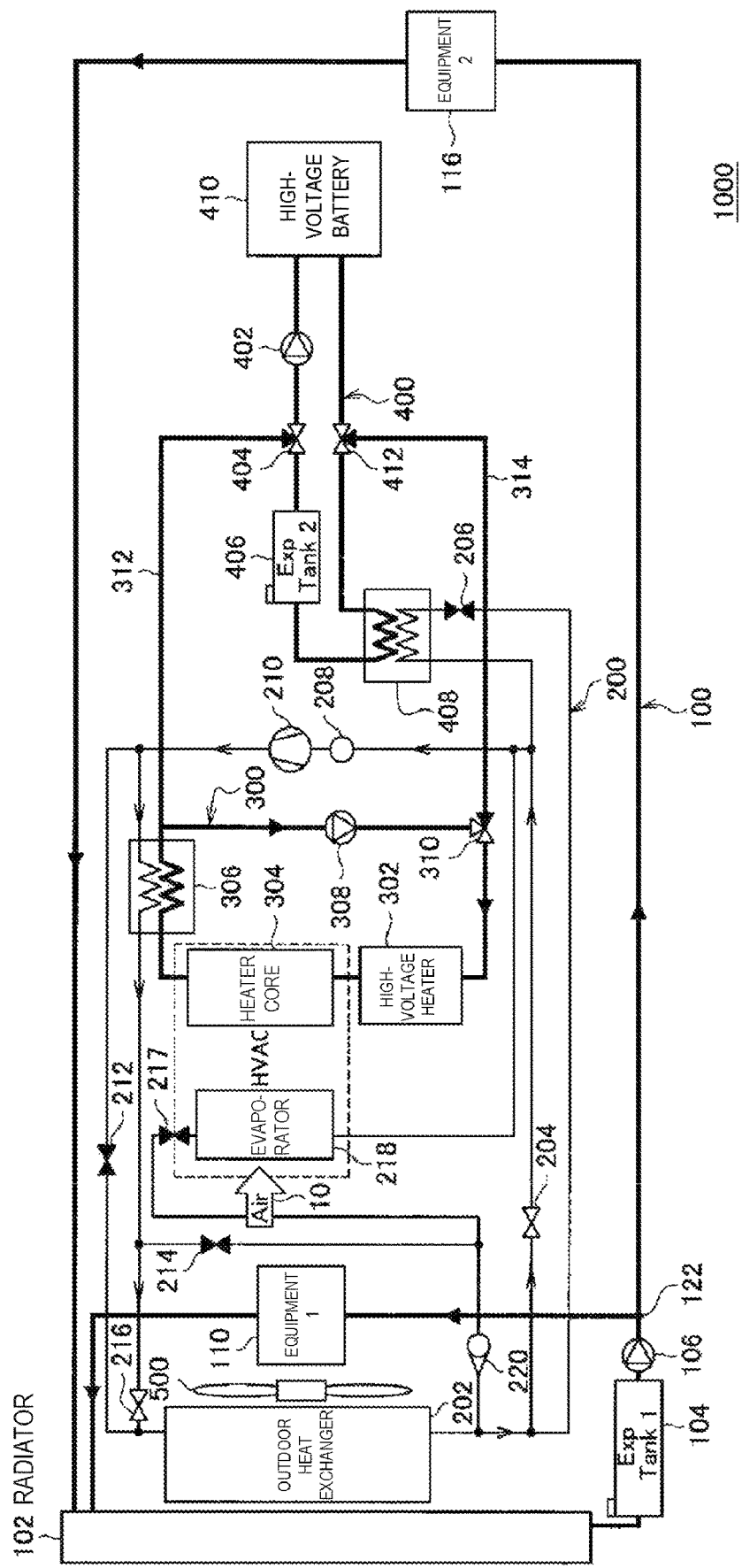
FIG. 10 is a schematic diagram illustrating the operations of heating the passenger compartment with a heat pump configuration.

FIG. 10 is a schematic diagram illustrating the operations of heating the passenger compartment with a heat pump configuration. By putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. Similarly to FIG. 5, the flow of liquid from the heating circuit 300 to the battery temperature regulation circuit 400 is stopped, and the battery temperature regulation circuit 400 is stopped. The air to be introduced into the passenger compartment is warmed by the heater core 304. In conditions in which the liquid in the heating circuit 300 is not given enough heat from the refrigerant, the high-voltage heater 302 is turned on to heat the liquid in the heating circuit 300 further.

Figure 11:
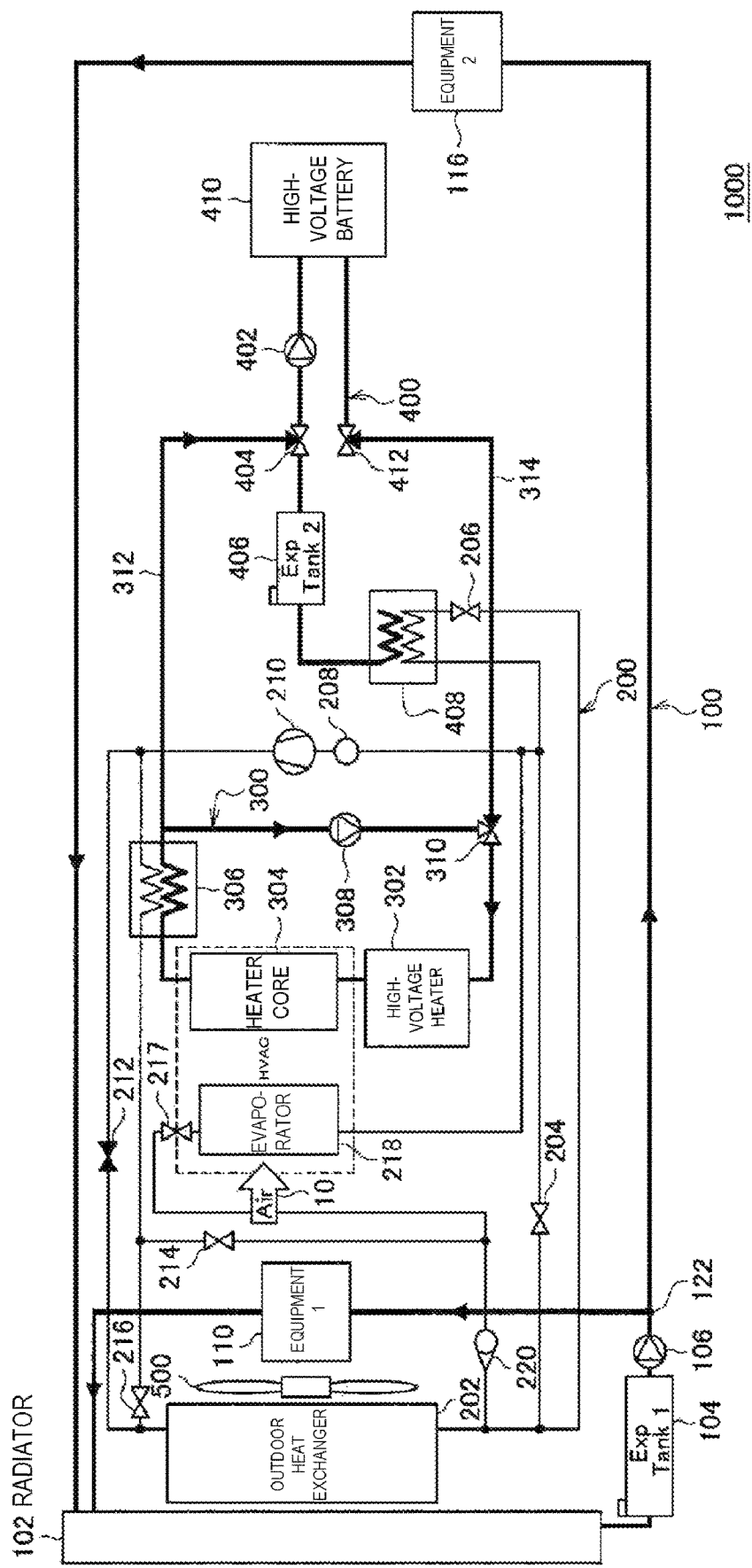
FIG. 11 is a schematic diagram illustrating the operations of heating the passenger compartment with a high-voltage heater.

FIG. 11 is a schematic diagram illustrating the operations of heating the passenger compartment with the high-voltage heater 302. By causing liquid in the heating circuit 300 to be heated by the high-voltage heater 302 and to exchange heat in the heater core 304, the passenger compartment is heated. The refrigerant circuit 200 is in a stopped state. Also, the flow of liquid from the heating circuit 300 to the battery temperature regulation circuit 400 is stopped, and the battery temperature regulation circuit 400 is stopped.

Figure 12:
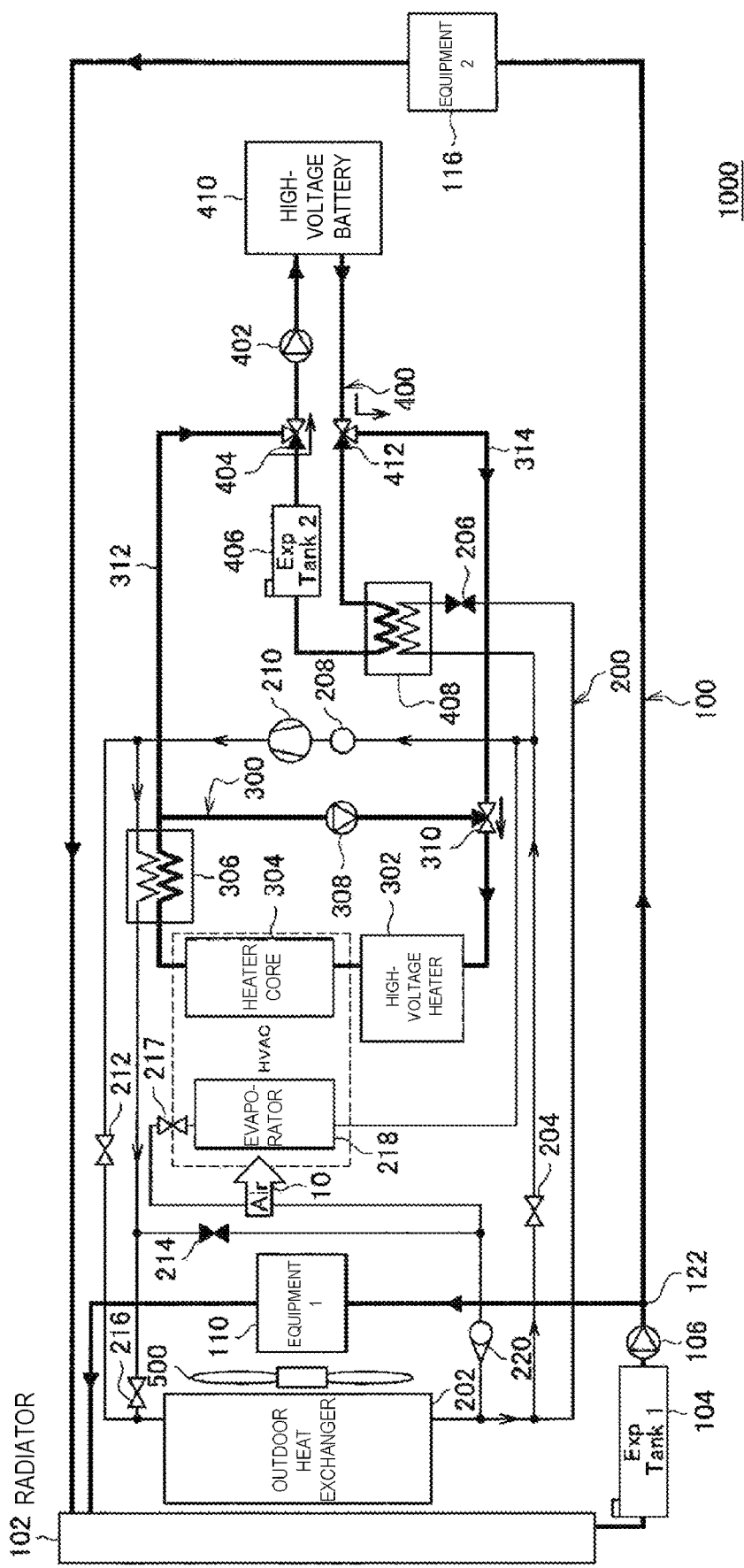
FIG. 12 is a schematic diagram illustrating the operations of warming up the high-voltage battery with a heat pump.

FIG. 12 is a schematic diagram illustrating the operations of warming up the high-voltage battery 410 with a heat pump. The basic operations are similar to FIG. 10, but in FIG. 12, the liquid in the heating circuit 300 is introduced into the battery temperature regulation circuit 400. For this reason, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402. When warming up the high-voltage battery 410 with a heat pump, by putting the refrigerant in a high-temperature, high-pressure state with the motorized compressor 210 and causing the liquid in the heating circuit 300 to exchange heat with the high-temperature, high-pressure refrigerant at the water-cooled condenser 306, the liquid in the heating circuit 300 is heated. For this reason, the high-voltage heater 302 remains in the stopped state unless the outdoor air temperature becomes extremely cold (for example, −10° C. or less) Consequently, power consumption may be suppressed, and energy usage efficiency may be raised.

As above, by basically using the refrigerant circuit 200 to exchange heat between refrigerant and air inside the passenger compartment and also to exchange heat between refrigerant and the liquid in the battery temperature regulation circuit 400, temperature regulation (cooling, heating) of the passenger compartment and temperature regulation of the high-voltage battery 410 are achieved. Furthermore, at extremely low temperatures, by coupling the heating circuit 300 and the battery temperature regulation circuit 400 to put both on the same circuit, it becomes possible to meet the temperature demand even at extremely low temperatures.

Figure 13:
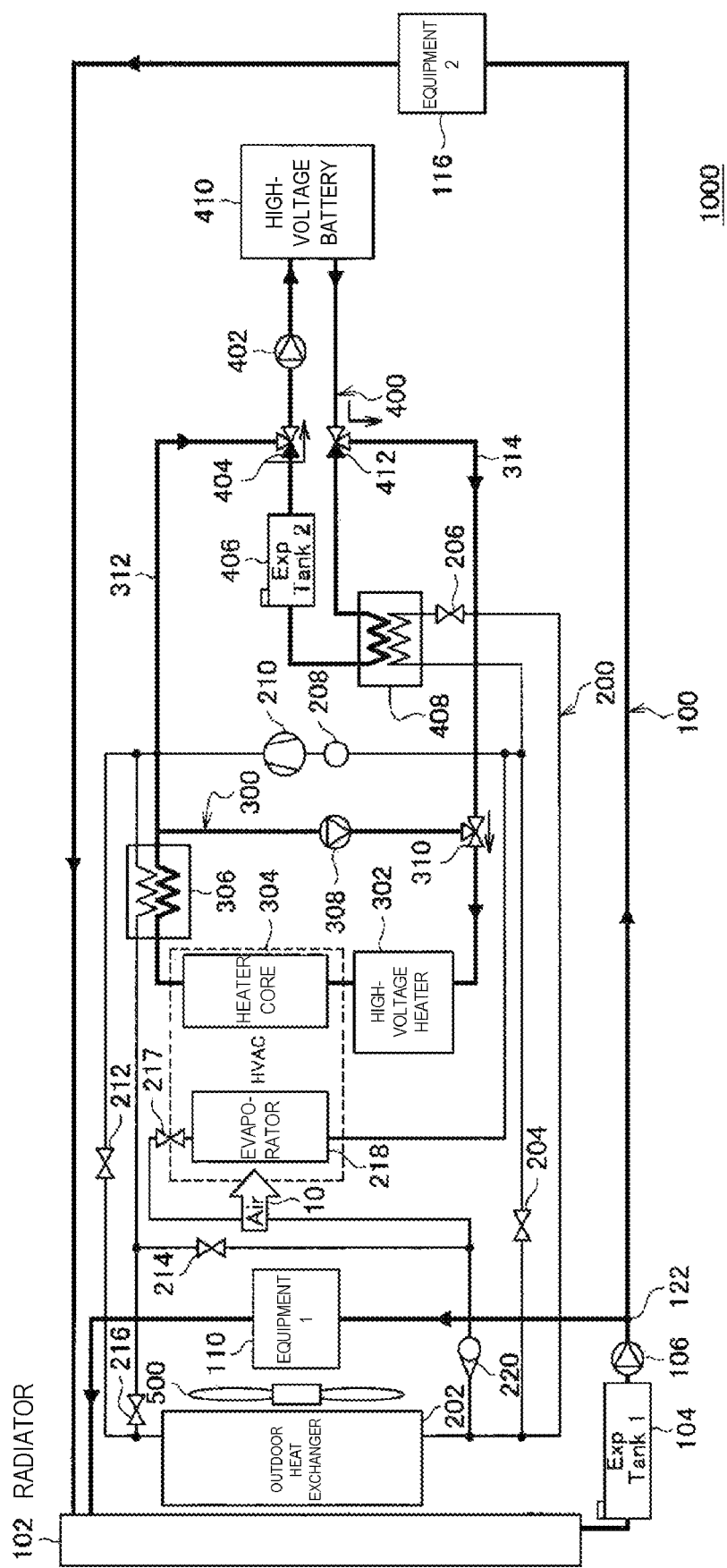
FIG. 13 is a schematic diagram illustrating the operations of warming up the high-voltage battery with a high-voltage heater.

FIG. 13 is a schematic diagram illustrating the operations of warming up the high-voltage battery 410 with the high-voltage heater 302. By causing the liquid in the heating circuit 300 to be heated by the high-voltage heater 302 and introduced into the battery temperature regulation circuit 400, the high-voltage battery 410 is warmed up. The refrigerant circuit 200 is in a stopped state. Likewise in FIG. 13, in the three-way valve 310 of the heating circuit 300 and the three-way valves 404 and 412 of the battery temperature regulation circuit 400, each valve is controlled such that liquid flows in the direction of the arrows. The liquid in the battery temperature regulation circuit 400 and the heating circuit 300 flows in the direction of the arrows by the action of the water pump 402.

3. Regulation of Temperature of High-Voltage Battery by Coolant of Power Electronics Cooling Circuit As above, in the heat management system 1000, the refrigerant circuit 200, the heating circuit 300, and the battery temperature regulation circuit 400 may be used to regulate the temperature of the high-voltage battery 410. Additionally, in the embodiment, it is also possible to regulate the temperature of the high-voltage battery 410 with the liquid flowing through the power electronics cooling circuit 100.

Figure 14:
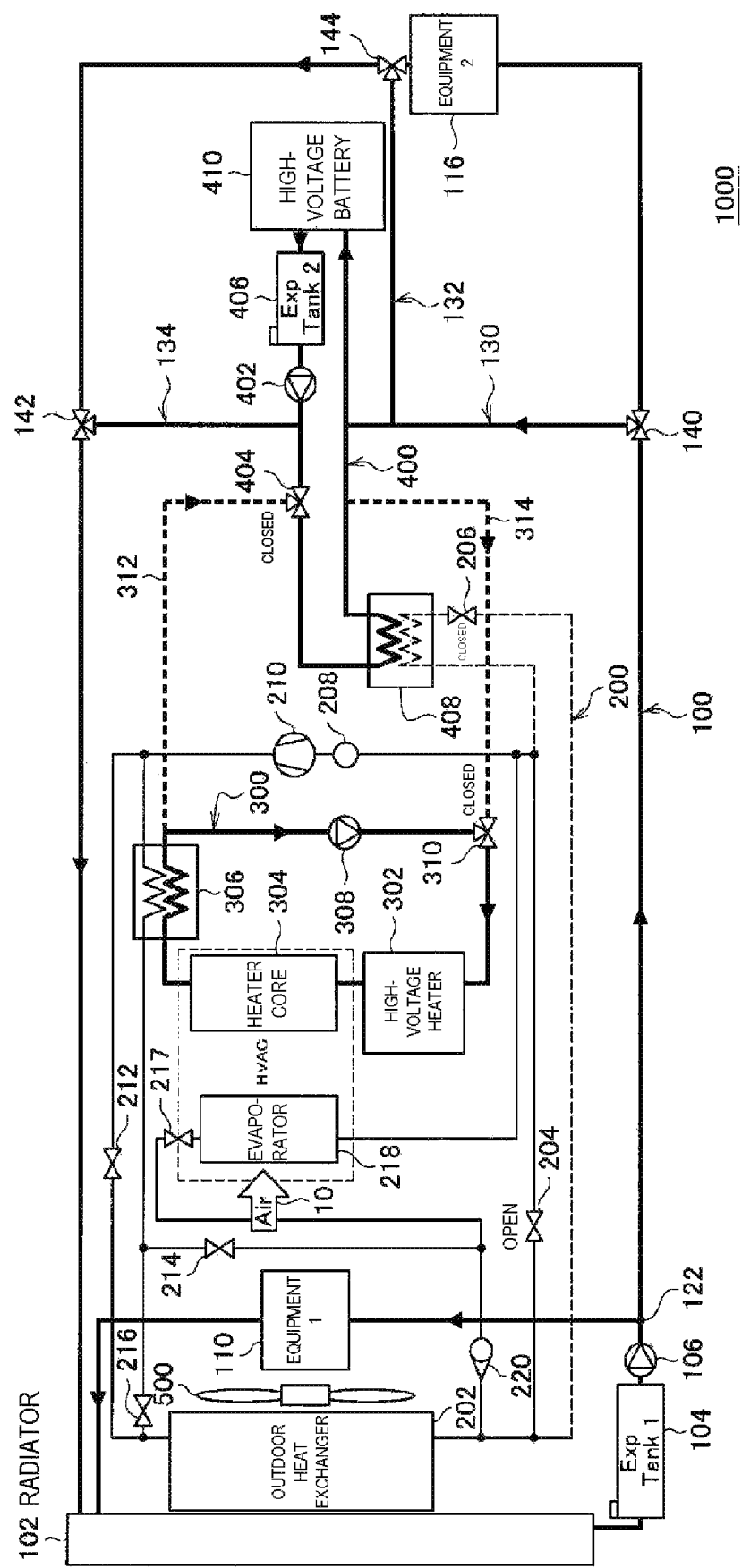
FIG. 14 is a schematic diagram illustrating an example of adding bypass water channels to the configuration of the power electronics cooling circuit illustrated in FIG. 1.

FIG. 14 is a schematic diagram illustrating an example of adding bypass water channels 130, 132, 134 and bypass three-way valves 140, 142, 144 to the configuration of the power electronics cooling circuit 100 illustrated in FIG. 1. The bypass water channels 130, 132, and 134 couple the power electronics cooling circuit 100 and the battery temperature regulation circuit 400. Also, in the configuration illustrated in FIG. 14, the expansion tank 406 of the battery temperature regulation circuit 400 is provided between the high-voltage battery 410 and the water pump 402. The same applies to FIGS. 15 and 16 described later.

With the configuration illustrated in FIG. 14, it becomes possible to cause the coolant for the power electronics (powertrain) cooled by the radiator 102 to flow through the battery temperature regulation circuit 400. Specifically, by switching channels using the bypass three-way valves 140, 142, and 144, the coolant for the power electronics may be used to regulate the temperature of the high-voltage battery 410. Note that it is preferable to stop the inflow and outflow of liquid between the heating circuit 300 and the battery temperature regulation circuit 400 by controlling the three-way valves 310 and 404. Also, heat exchange by the chiller 408 does not have to be performed particularly.

The coolant flowing through the power electronics cooling circuit 100 normally is at a higher temperature than the liquid flowing through the battery temperature regulation circuit 400. Consequently, the coolant for the power electronics may be used to warm up the high-voltage battery 410. As described above, when the temperature of the high-voltage battery 410 rises moderately, the electric power generated by the high-voltage battery 410 increases. Consequently, by using the coolant for the power electronics to warm up the high-voltage battery 410, it is possible to regulate the temperature of the high-voltage battery 410 optimally and cause the high-voltage battery 410 to exhibit high output.

On the other hand, in the case in which the temperature of the coolant flowing through the power electronics cooling circuit 100 is lower than the temperature of the liquid flowing through the battery temperature regulation circuit 400, it is also possible to use the coolant for the power electronics to cool the high-voltage battery 410. For example, since the high-voltage battery 410 generates when being charged, the coolant for the power electronics that has exchanged heat with outdoor air at the radiator 102 may be at a lower temperature than the liquid flowing through the battery temperature regulation circuit 400 in some cases. In such cases, by introducing the coolant for the power electronics into the battery temperature regulation circuit 400, the high-voltage battery 410 may be cooled.

Also, in the case of using the coolant for the power electronics to warm up the high-voltage battery 410, compared to the case of warming up the temperature of the high-voltage battery 410 according to the procedures described in FIGS. 9, 12, and 13, since the refrigerant circuit 200 and the heating circuit 300 are not used, power consumption may be reduced. More specifically, in the case of using the coolant for the power electronics to warm up the high-voltage battery 410, power is consumed only by the water pump 106. On the other hand, in the case of using the refrigerant circuit 200 and the heating circuit 300, since the motorized compressor 210, the water pump 308, the high-voltage heater 302, and the like act, the power consumption increases. Consequently, by using the coolant for the power electronics to warm up the high-voltage battery 410, it is possible to greatly reduce power consumption.

Furthermore, in the case of using the coolant for the power electronics to warm up the high-voltage battery 410, the coolant for the power electronics that has already reached a high temperature may be used to warm up the high-voltage battery 410 in a short time. Consequently, it is possible to shorten the arrival time at which the high-voltage battery 410 arrives at the target temperature.

In particular, in the case of causing the high-voltage heater 302 to act to warm up the high-voltage battery 410, power consumption by the high-voltage heater 302 increases, the driving output drops, and there is a possibility that cruising radius of the vehicle will be reduced. On the other hand, with the coolant flowing through the power electronics cooling circuit 100, since the first piece of equipment 110 and the second piece of equipment 116 generate heat due to vehicle travel, it is possible to utilize the heat generated by vehicle travel effectively to warm up the high-voltage battery 410. Consequently, in the case of using the coolant for the power electronics to warm up the high-voltage battery 410, energy loss basically does not occur.

With this arrangement, when causing the vehicle to travel in a low-temperature environment, such as during winter for example, it is possible to warm up the high-voltage battery 410 in a short time and cause the high-voltage battery 410 to exhibit the desired output.

Note that in cases where using the refrigerant circuit 200 or the heating circuit 300 to warm up the high-voltage battery 410 consumes less power than using the coolant for the power electronics to warm up the high-voltage battery 410, it is preferable to use the refrigerant circuit 200 or the heating circuit 300 to warm up the high-voltage battery 410.

Figure 15:
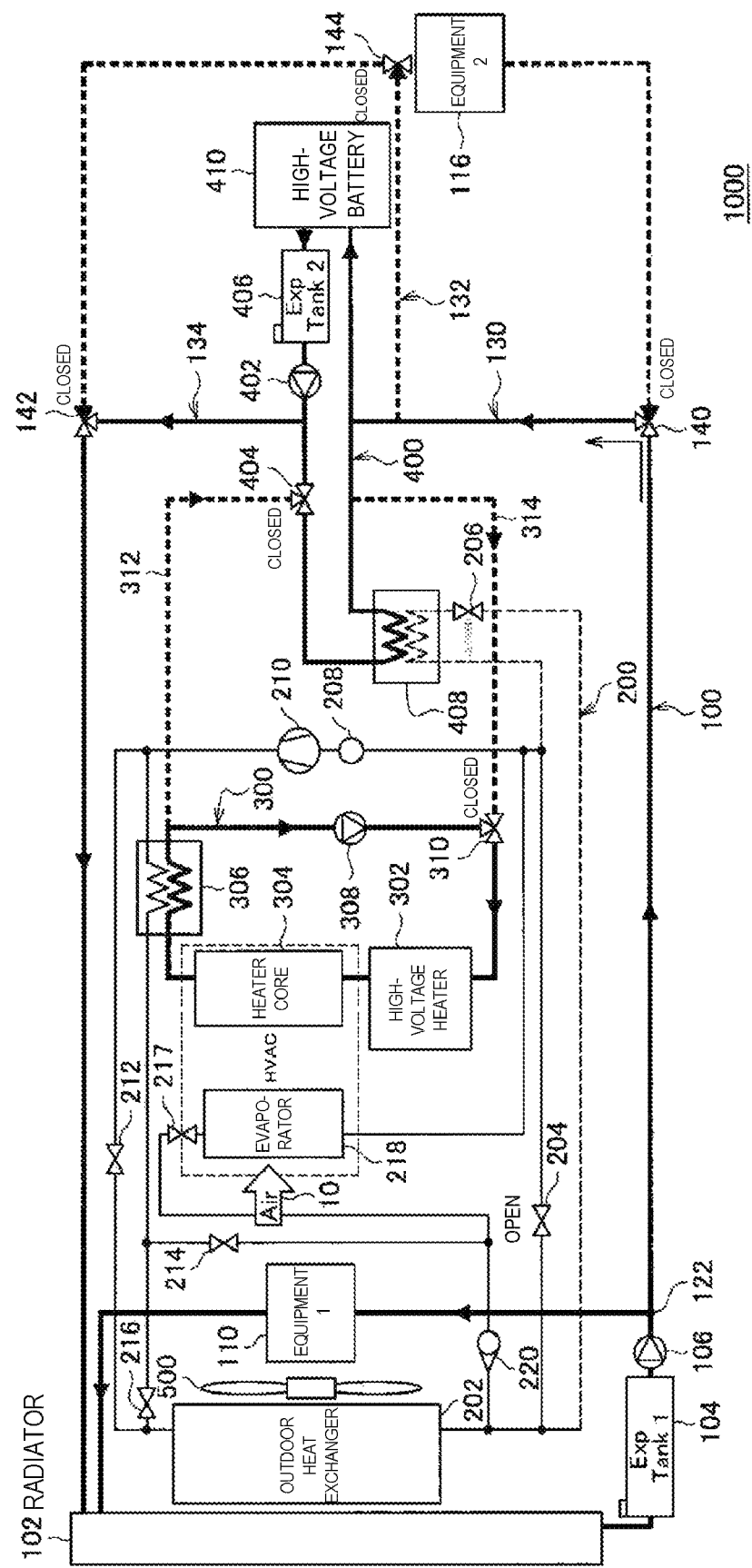
FIG. 15 is a schematic diagram illustrating a state of regulating the temperature of the high-voltage battery by utilizing powertrain cooling water in the configuration illustrated in FIG. 14.

FIG. 15 is a schematic diagram illustrating a state of regulating the temperature of the high-voltage battery 410 by utilizing powertrain cooling water in the configuration illustrated in FIG. 14. FIG. 15 illustrates the case of not using waste heat from the second piece of equipment 116. As illustrated in FIG. 15, by controlling the bypass three-way valve 140, the channel proceeding from the three-way valve 140 to the second piece of equipment 116 is closed. In addition, the three-way valve 144 is also closed.

For this reason, the powertrain coolant flows from the three-way valve 140 through the bypass channel 130 to the battery temperature regulation circuit 400. Additionally, the powertrain coolant flowing to the battery temperature regulation circuit 400 enters the battery temperature regulation circuit 400 and flows in the direction of the high-voltage battery 410→water pump 402→bypass channel 134→three-way valve 142. With this arrangement, it is possible to use the powertrain coolant to regulate the temperature of the high-voltage battery 410.

Also, in the example illustrated in FIG. 15, since heat is not exchanged with the battery temperature regulation circuit 400, the refrigerant circuit 200 may be used exclusively to regulate the temperature of the passenger compartment.

Figure 16:
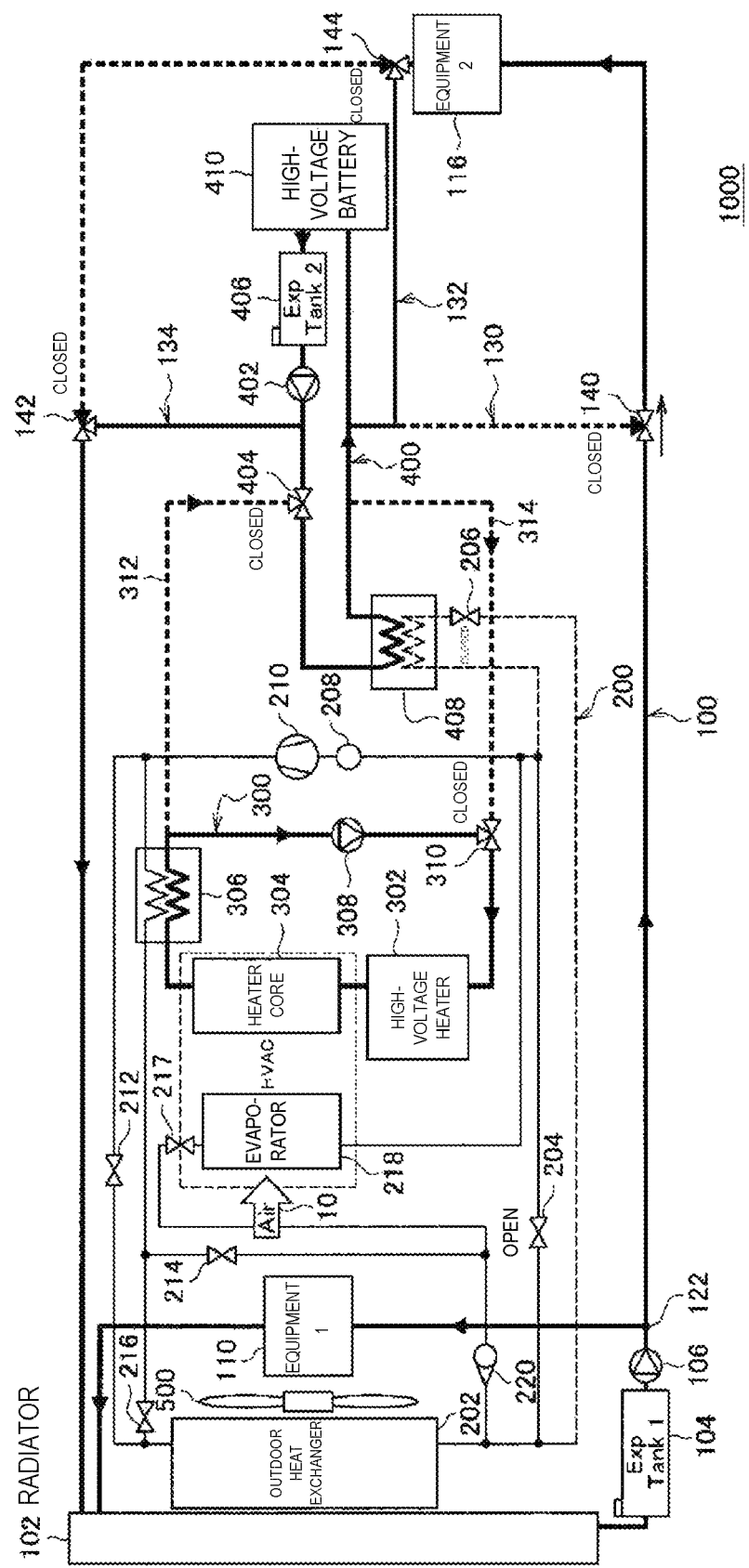
FIG. 16 is a schematic diagram illustrating a case of using the waste heat of a second piece of equipment.

FIG. 16 is a schematic diagram illustrating a case of using the waste heat of the second piece of equipment. In the example illustrated in FIG. 16, by controlling the bypass three-way valve 140, the channel proceeding from the three-way valve 140 to the second piece of equipment 116 is opened, and the channel proceeding from the three-way valve 140 to the battery temperature regulation circuit 400 is closed.

Also, by controlling the three-way valve 144, the channel proceeding from the three-way valve 144 to the battery temperature regulation circuit 400 is opened, and the channel proceeding from the three-way valve 144 to the three-way valve 142 is closed.

For this reason, the coolant after cooling the second piece of equipment 116 flows from the three-way valve 144 through the bypass channel 132 to the battery temperature regulation circuit 400. Additionally, the powertrain coolant flowing to the battery temperature regulation circuit 400 enters the battery temperature regulation circuit 400 and flows in the direction of the high-voltage battery 410→water pump 402→bypass channel 134→three-way valve 142. With this arrangement, the coolant after cooling the second piece of equipment 116 may be used to regulate the temperature of the high-voltage battery 410.

By having the coolant cool the second piece of equipment 116, heat is exchanged between the second piece of equipment 116 and the coolant. With this arrangement, the waste heat from the second piece of equipment 116 may be introduced into the battery temperature regulation circuit 400. Consequently, it becomes possible to utilize the waste heat from the second piece of equipment 116 to regulate the temperature of the high-voltage battery 410, and more particularly, it becomes possible to utilize the waste heat to warm up the high-voltage battery 410.

Figure 17:
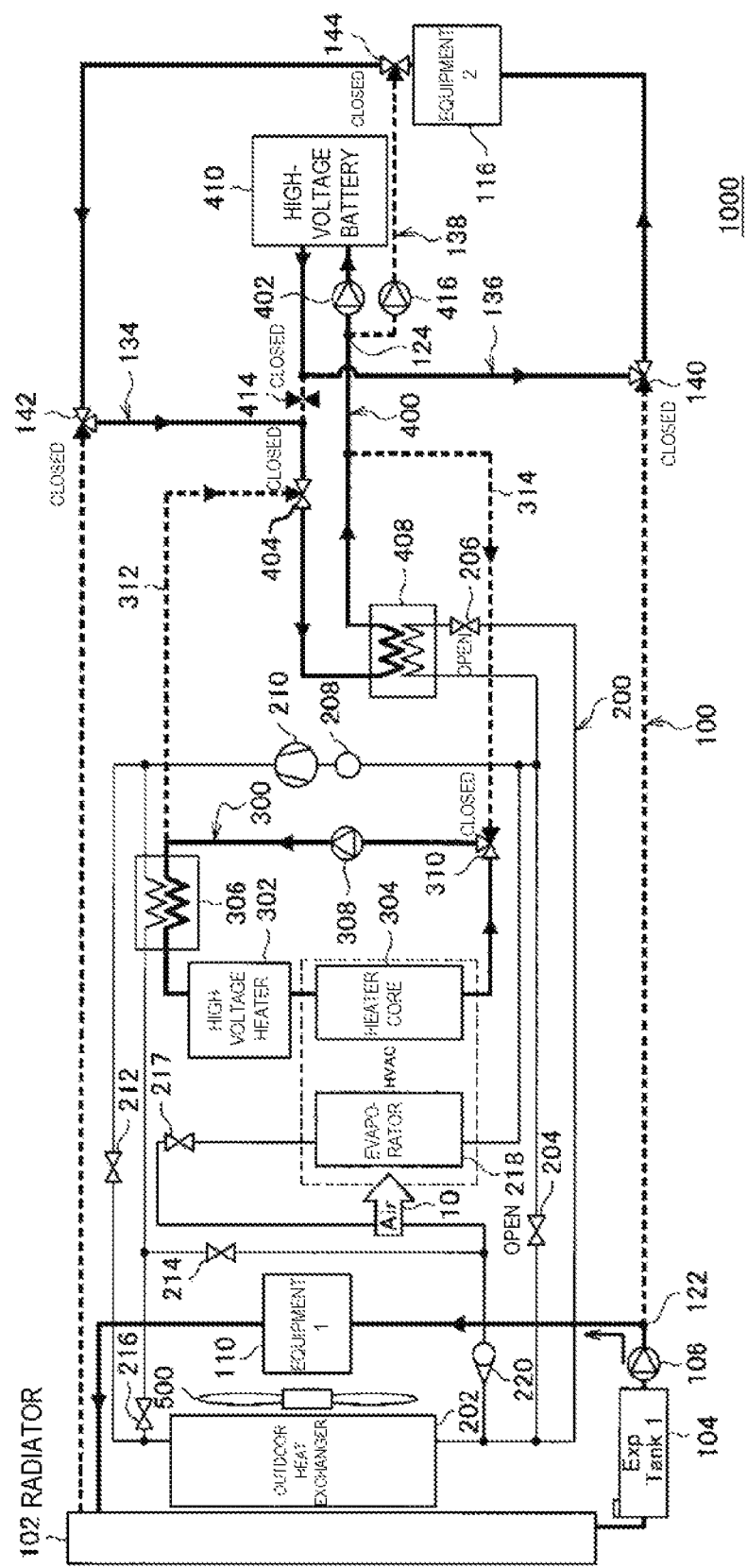
FIG. 17 is a schematic diagram illustrating an example of cooling a first piece of equipment by utilizing powertrain coolant and cooling a second piece of equipment by utilizing coolant of the battery temperature regulation circuit.
Figure 18:
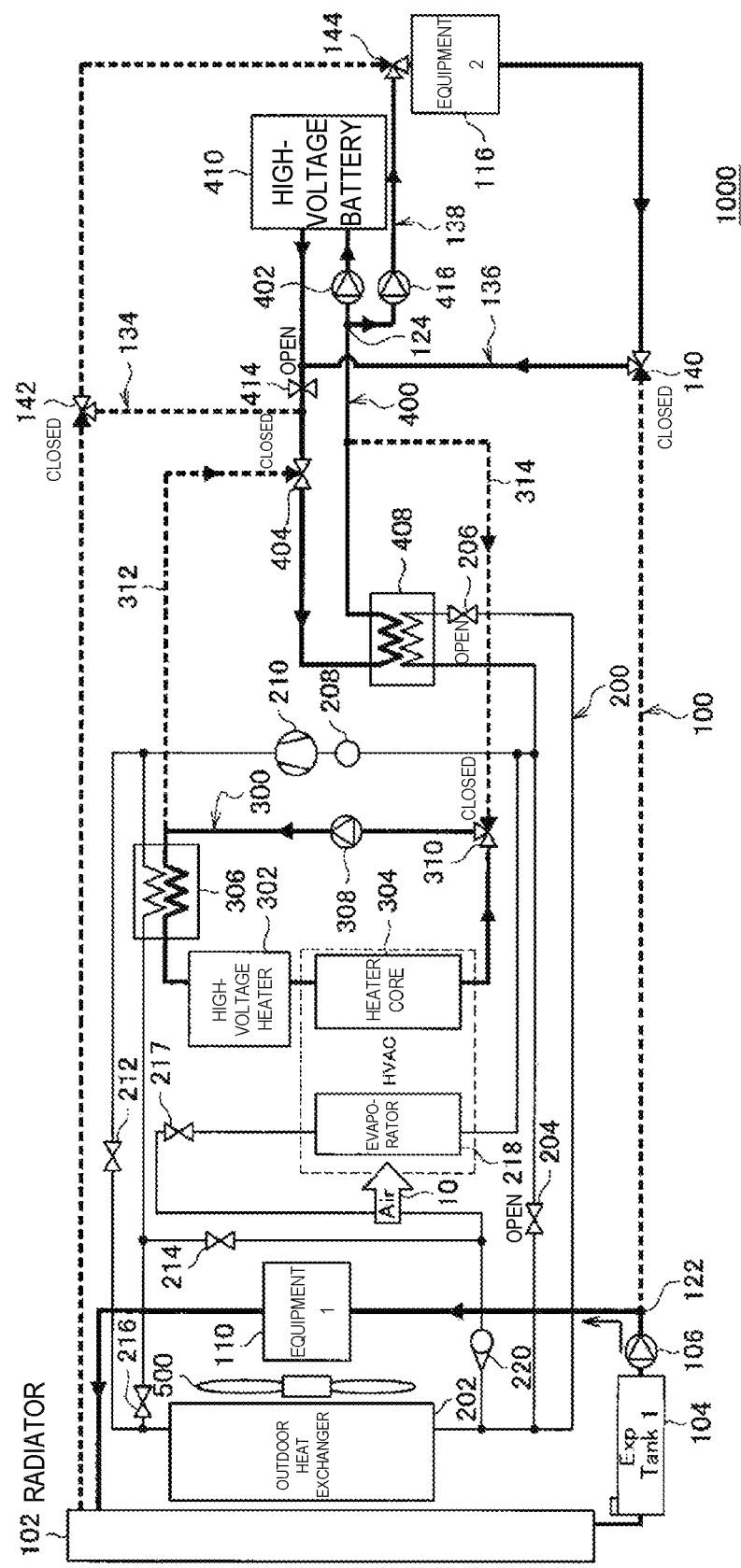
FIG. 18 is a schematic diagram illustrating a different example of cooling a first piece of equipment by utilizing powertrain coolant and cooling a second piece of equipment by utilizing coolant of the battery temperature regulation circuit.

Next, an example of cooling the first piece of equipment 110 and the second piece of equipment 116 individually will be described on the basis of the configuration illustrated in FIG. 14. FIGS. 17 and 18 are schematic diagrams illustrating an example of cooling only the first piece of equipment 110 using the powertrain coolant. In FIGS. 17 and 18, the second piece of equipment 116 is cooled by using the coolant of the battery temperature regulation circuit 400.

The configurations illustrated in FIGS. 17 and 18 are the same, and FIGS. 17 and 18 differ from each other in whether the cooling of the second piece of equipment 116 and the high-voltage battery 410 is in series or in parallel. In the following, the configuration shared in common between FIGS. 17 and 18 will be described, and after that the operations of each of FIGS. 17 and 18 will be described.

In the configuration illustrated in FIGS. 17 and 18, the bypass channel 130 illustrated in FIG. 14 is not provided, and a bypass channel 136 is provided instead of the bypass channel 130. Additionally, a solenoid valve 414 is provided between the site where the bypass channel 136 and the battery temperature regulation circuit 400 are coupled and the site where the bypass channel 130 and the battery temperature regulation circuit 400 are coupled.

Also, in the configuration illustrated in FIGS. 17 and 18, the bypass channel 132 illustrated in FIG. 14 is not provided, and a bypass channel 138 is provided instead of the bypass channel 132. A water pump 416 is provided in the bypass channel 138. Also, in the configuration illustrated in FIGS. 17 and 18, the water pump 402 is provided on the upstream side of the high-voltage battery 410, and the expansion tank 406 is not provided. Furthermore, in the configuration illustrated in FIGS. 17 and 18, the flow direction of the liquid in the heating circuit 300 is the reverse of FIG. 14, and the arrangement of the high-voltage heater 302 and the heater core 304 with respect to the flow direction is also the reverse of FIG. 14.

Hereinafter, the operations illustrated in FIG. 17 will be described. As illustrated in FIG. 17, by controlling the bypass three-way valve 140, the flow of powertrain coolant from the water pump 106 to the three-way valve 140 is stopped. For this reason, the powertrain coolant passing through the radiator 102 is not divided in two directions at the branch 122, and is supplied to the first piece of equipment 110 by the action of the water pump 106. With this arrangement, only the first piece of equipment 110 is cooled by the powertrain coolant. After cooling the first piece of equipment 110, the inverter 112, and the DC/DC converter 114, the powertrain coolant is returned to the radiator 102.

As described above, by controlling the bypass three-way valve 140, the flow of powertrain coolant from the water pump 106 to the three-way valve 140 is stopped. On the other hand, in the three-way valve 140, the channel proceeding from the battery temperature regulation circuit 400 to the charger 120 is opened. Also, by controlling the three-way valve 144, the channel proceeding from the second piece of equipment 116 to the three-way valve 142 is opened, and the channel proceeding from the second piece of equipment 116 to the bypass channel 138 is closed.

Also, by controlling the three-way valve 142, the channel proceeding from the second piece of equipment 116 through the bypass channel 134 to the battery temperature regulation circuit 400 is opened, and the channel proceeding from the three-way valve 142 to the radiator 102 is closed. Furthermore, by closing parts of the three-way valve 310, the three-way valve 404, and the three-way valve 412, the liquid in the heating circuit 300 does not flow into the battery temperature regulation circuit 400. In addition, the solenoid valve 414 provided in the battery temperature regulation circuit 400 is closed.

By the action of the water pump 402, the liquid in the battery temperature regulation circuit 400 and the power electronics cooling circuit 100 flows in the direction of the arrows in FIG. 17, and the liquid is introduced to the second piece of equipment 116. At this time, the refrigerant circuit 200 is operating, and by exchanging heat between the refrigerant flowing through the refrigerant circuit 200 and the liquid flowing through the battery temperature regulation circuit 400 at the chiller 408, the liquid flowing through the battery temperature regulation circuit 400 is cooled.

Specifically, the liquid cooled at the chiller 408 is introduced to the high-voltage battery 410 to cool the high-voltage battery 410. Furthermore, the liquid that has cooled the high-voltage battery 410 flows from the bypass channel 136 to the second piece of equipment 116 to cool the second piece of equipment 116. After cooling these power electronics, the liquid passes through the three-way valve 142 and returns to the battery temperature regulation circuit 400 from the bypass channel 134. The liquid returning to the battery temperature regulation circuit 400 is cooled by heat exchange at the chiller 408.

As above, by closing the solenoid valve 414, the high-voltage battery 410 is connected in series with the power electronics such as the second piece of equipment 116, the inverter 118, and the charger 120. For this reason, all of the liquid that has cooled the high-voltage battery 410 is introduced to the second piece of equipment 116. Consequently, the cooling capacity of the second piece of equipment 116 may be improved.

According to a configuration like the above, the powertrain coolant cooled by the radiator 102 is supplied only to the first piece of equipment 110. With this arrangement, all of the powertrain coolant cooled by the radiator 102 is supplied to the first piece of equipment 110, and is not supplied to the second piece of equipment 116. Also, the capacity of the water pump 106 may be used only for the first piece of equipment 110. Consequently, the flow rate of coolant to the first piece of equipment 110 may be increased. Also, the powertrain coolant receiving heat from the second piece of equipment 116 is avoided. With this arrangement, the cooling capacity for the first piece of equipment 110 may be increased greatly, making it possible to cool the first piece of equipment 110 reliably.

Also, by exchanging heat between the refrigerant flowing through the refrigerant circuit 200 and the liquid flowing through the battery temperature regulation circuit 400 at the chiller 408, the liquid flowing through the battery temperature regulation circuit 400 is cooled and introduced to the second piece of equipment 116. Consequently, it is also possible to cool the second piece of equipment 116 reliably.

Herein, in the case of utilizing the heat exchange at the radiator 102 to cool the first piece of equipment 110 and the second piece of equipment 116, it is not possible to cool the powertrain coolant to below the outdoor air temperature. For this reason, if one attempts to cool both the first piece of equipment 110 and the second piece of equipment 116 with only the heat exchange of the radiator 102, cases in which sufficient cooling cannot be achieved are anticipated. If these pieces of equipment cannot be cooled sufficiently, since the equipment will be unable to exhibit the desired output, it may be necessary to put limitations in advance on the driving force to be generated by the vehicle in some cases.

According to the configuration illustrated in FIG. 17, for the second piece of equipment 116, cooling is performed by the refrigerant flowing through the refrigerant circuit 200. Specifically, by exchanging heat between the refrigerant flowing through the refrigerant circuit 200 and the liquid flowing through the battery temperature regulation circuit 400, low-temperature liquid may be supplied to the second piece of equipment 116, and the second piece of equipment 116 may be cooled sufficiently. Consequently, a drop in output caused by overheating of the second piece of equipment 116 may be suppressed reliably. With this arrangement, limitations on the output of the vehicle may be avoided, making it possible to cause the vehicle to exhibit the desired driving force.

Note that compared to the power electronics such as the second piece of equipment 116, the high-voltage battery 410 is controlled to a lower temperature. For this reason, even if the liquid is introduced to the power electronics such as the second piece of equipment 116 after first cooling the high-voltage battery 410, sufficient cooling capacity may be obtained.

Also, for the first piece of equipment 110, all of the powertrain coolant cooled by the radiator 102 is supplied to the first piece of equipment 110. Consequently, compared to the case of supplying the powertrain coolant to both the first piece of equipment 110 and the second piece of equipment 116, the amount of powertrain coolant to supply to the first piece of equipment 110 may be increased, making it possible to greatly improve the cooling capacity for the first piece of equipment 110.

For example, in the case in which the vehicle speed is relatively slow, since a small amount of air hits the radiator 102, if one attempts to cool both the first piece of equipment 110 and the second piece of equipment 116 with the powertrain coolant, the cooling capacity for the motor provided by the powertrain coolant may be insufficient in some cases. If the cooling capacity for the motor is insufficient, the motor is unable to exhibit the desired output, and it becomes necessary to limit the driving force as described above. The driving force is limited to keep the motor from overheating when the motor temperature reaches 65° C. or higher, for example. When the driving force is limited, the vehicle is no longer able to exhibit the desired power performance in cases such as climbing a hill or traveling over an uneven road, for example. In particular, in the summer and the like, there is a possibility that the outdoor air temperature may rise up to around 40° C., and if the cooling of the motor is insufficient, a drop in the motor output is more likely to occur.

In such cases, a situation is anticipated in which the first piece of equipment 110 and the second piece of equipment 116 cannot be cooled sufficiently by cooling according to the outdoor air temperature using the radiator 102. According to the embodiment, since heat exchange with refrigerant is utilized to cool the second piece of equipment 116, it is possible to lower the temperature of the second piece of equipment 116 to the outdoor air temperature or below (for example, approximately 18° C. to 20° C.). Also, by supplying all of the coolant cooled by the radiator 102 to the first piece of equipment 110, although the difference between the motor temperature and the outdoor air temperature is relatively small, the flow rate of powertrain coolant may be increased to cool the first piece of equipment 110. Consequently, it is also possible to cool the first piece of equipment 110 rapidly down to the same level as the outdoor air temperature.

Next, the operations in FIG. 18 will be described. The cooling of the first piece of equipment 110 by the powertrain coolant is similar to FIG. 17. In FIG. 18, after cooling the high-voltage battery 410, the liquid flowing through the battery temperature regulation circuit 400 is cooled by exchanging heat at the chiller 408, and is supplied to the second piece of equipment 116.

As illustrated in FIG. 18, by controlling the bypass three-way valve 140, the flow of powertrain coolant from the water pump 106 to the three-way valve 140 is stopped. On the other hand, in the three-way valve 140, the channel proceeding from the charger 120 through the bypass channel 136 to the battery temperature regulation circuit 400 is opened. Also, by controlling the three-way valve 144, the channel proceeding from the battery temperature regulation circuit 400 through the bypass channel 138 to the second piece of equipment 116 is opened, and the channel proceeding from the three-way valve 142 to the second piece of equipment 116 is closed.

Also, by controlling the three-way valve 142, the channel proceeding from the battery temperature regulation circuit 400 through the bypass channel 134 to the second piece of equipment 116 is opened, and the channel proceeding from the three-way valve 142 to the radiator 102 is closed. Similarly to FIG. 17, by closing parts of the three-way valve 310, the three-way valve 404, and the three-way valve 412, the liquid in the heating circuit 300 does not flow into the battery temperature regulation circuit 400. In addition, the solenoid valve 414 provided in the battery temperature regulation circuit 400 is opened.

By the action of the water pump 402, the liquid in the battery temperature regulation circuit 400 and the power electronics cooling circuit 100 flows in the direction of the arrows in FIG. 18, and the liquid is introduced to the second piece of equipment 116. At this time, the refrigerant circuit 200 is operating, and by exchanging heat between the refrigerant flowing through the refrigerant circuit 200 and the liquid flowing through the battery temperature regulation circuit 400 at the chiller 408, the liquid flowing through the battery temperature regulation circuit 400 is cooled.

Specifically, the liquid cooled at the chiller 408 branches at a branch 124 that couples the battery temperature regulation circuit 400 and the bypass channel 138, and is introduced to both the high-voltage battery 410 and the second piece of equipment 116. At this point, by causing the water pump 416 to act, the liquid in the battery temperature regulation circuit 400 flows through the bypass channel 138. With this arrangement, both the high-voltage battery 410 and the second piece of equipment 116 are cooled. After cooling these power electronics, the liquid passes through the three-way valve 140 and returns to the battery temperature regulation circuit 400 from the bypass channel 136.

As above, by opening the solenoid valve 414, causing the water pump 402 to act, and additionally causing the water pump 416 to act, two channels joining the high-voltage battery 410 and the power electronics (the second piece of equipment 116, the inverter 118, and the charger 120) in series may be formed.

The first channel is a channel that circulates through the chiller 408→water pump 416→three-way valve 144→power electronics→three-way valve 140→chiller 408 sequentially. Also, the second channel is a channel that circulates through the chiller 408→high-voltage battery 410→water pump 402→chiller 408 sequentially.

Furthermore, since the water pump 416 serves as a flow rate adjustment function, the flow ratio between the first and second channels may be adjusted optimally. Consequently, it becomes possible to provide an optimal amount of liquid at an optimal temperature to each of the first channel and the second channel. Also, by the action of the water pump 416, it is possible to return the liquid from the power electronics back to the battery temperature regulation circuit 400, and reliably deter flow (backflow) proceeding from the water pump 402 to the three-way valve 140.

According to a configuration like the above, similarly to FIG. 17, since all of the powertrain coolant cooled by the radiator 102 is supplied to the first piece of equipment 110 and is not supplied to the second piece of equipment 116, it is possible to increase the flow rate of coolant to the first piece of equipment 110.

Also, by exchanging heat between the refrigerant flowing through the refrigerant circuit 200 and the liquid flowing through the battery temperature regulation circuit 400 at the chiller 408, the liquid flowing through the battery temperature regulation circuit 400 is cooled and introduced to the second piece of equipment 116. Consequently, it is also possible to cool the second piece of equipment 116 reliably.

Furthermore, according to FIG. 18, the liquid cooled at the chiller 408 branches at the branch 124 that couples the battery temperature regulation circuit 400 and the bypass channel 138, and is introduced to both the high-voltage battery 410 and the second piece of equipment 116. For this reason, low-temperature liquid cooled by the chiller 408 is introduced to the second piece of equipment 116. For this reason, compared to FIG. 17 in which the liquid is introduced to the second piece of equipment 116 after cooling the high-voltage battery 410, since liquid at a lower temperature may be introduced to the second piece of equipment 116, the second piece of equipment 116 may be cooled reliably.

With this arrangement, since the second piece of equipment 116 may be cooled rapidly, it also becomes possible to make the second piece of equipment 116 temporarily produce output at or above the rated output. Consequently, the acceleration performance of the vehicle may be improved greatly, and the performance for escaping from a stuck state or the like may also be improved. Consequently, it becomes possible to greatly raise the merchantability of the vehicle.

Particularly, in cases in which the temperature of the high-voltage battery 410 is relatively low and the second piece of equipment 116 is overheating, since the low-temperature liquid may be introduced to the second piece of equipment 116, the second piece of equipment 116 may be cooled reliably.

It is preferable to be able to switch between the mode illustrated in FIG. 17 and the mode illustrated in FIG. 18 according to the state of heat generation in the high-voltage battery 410 and the second piece of equipment 116. With this arrangement, it is possible to provide liquid at an optimal temperature to the high-voltage battery 410 and the power electronics at an optimal flow rate. For example, between the mode illustrated in FIG. 17 and the mode illustrated in FIG. 18, the mode with the shorter arrival time may be selected according to the arrival time by which equipment reaches a target temperature. Also, in cases such as when traveling in economy mode for example, since the vehicle runs prioritizing power consumption over the time it takes for equipment to reach the target temperature, it is also possible to select the mode with lower power consumption between the mode illustrated in FIG. 17 and the mode illustrated in FIG. 18. Also, according to the configurations illustrated in FIGS. 17 and 18, since two refrigerant circuits (the power electronics cooling circuit 100 and the battery temperature regulation circuit 400) are coupled by three-way valves, the expansion tank 406 may be omitted and a single expansion tank may be used.

Note that in the example illustrated in FIG. 17, the temperature of the liquid introduced to the second piece of equipment 116 is expected to be higher than in FIG. 18 due to cooling the high-voltage battery 410, but in the example illustrated in FIG. 17, all of the liquid flowing through the battery temperature regulation circuit 400 is introduced to the second piece of equipment 116. Consequently, in the example illustrated in FIG. 17, the temperature of the liquid introduced to the second piece of equipment 116 rises as a result of cooling the high-voltage battery 410, but by introducing all of the liquid flowing through the battery temperature regulation circuit 400 to the second piece of equipment 116, it is possible to cool the second piece of equipment 116 reliably.

As above, in the embodiment, by taking a configuration enabling the selection of circuits that cool or warm up each part such as the first piece of equipment 110 and the second piece of equipment 116 in a vehicle such as an electric vehicle, it is possible to select and execute different cooling methods for different purposes, such as a mode with low power consumption per unit time and a mode with a short time to reach a target temperature. Also, it becomes possible to cool the power electronics such as the motor and inverter intensively by circuit selection. Furthermore, because it is possible to configure a refrigerant circuit capable of providing a cooling water temperature at or below the outdoor air temperature, output limitations on the power electronics due to variations in the cooling capacity depending on the outdoor air temperature may be avoided, and an improvement in the output of the power electronics also becomes possible.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

According to the disclosure, it is possible to provide a vehicle heat management system capable of optimally cooling high-voltage parts that require cooling.

The invention claimed is:

1. A vehicle heat management system comprising:
   a refrigerant circuit configured to circulate a refrigerant to regulate a temperature inside a passenger compartment therethrough;
   a battery temperature regulation circuit configured to regulate a temperature of a battery by introducing a liquid that exchanges heat with the refrigerant to the battery, the battery temperature regulation circuit comprising a first control valve on a downstream side of the battery and a heat exchanger on a downstream side of the first control valve and configured to exchange heat with the refrigerant;

an electric part cooling circuit configured to circulate a liquid cooled by a radiator therethrough, the electric part cooling circuit being capable of cooling a first piece of equipment and a second piece of equipment for driving a vehicle; and a first bypass channel configured to introduce the liquid of the battery temperature regulation circuit to the second piece of equipment, wherein in a first mode, the liquid cooled by the radiator cools the first piece of equipment, the liquid which has exchanged heat with the refrigerant is introduced in parallel to the battery and the second piece of equipment, and the first control valve is open such that the liquid which has flowed out from the battery and the second piece of equipment flows through the first control valve, and in a second mode, the first control valve is closed such that the liquid does not flow through the first control valve, and the liquid which has exchanged heat with the refrigerant is introduced in series to the battery and the second piece of equipment such that the liquid flowing out from the battery passes through the first bypass channel and is introduced to the second piece of equipment.

2. The vehicle heat management system according to claim 1, wherein
the battery temperature regulation circuit comprises a branch, and
the liquid which has exchanged heat with the refrigerant is divided at the branch and introduced to each of the battery and the second piece of equipment.

3. The vehicle heat management system according to claim 2, further comprising:
a second bypass channel that branches from the battery temperature regulation circuit at the branch and is configured to be coupled to the second piece of equipment; and
a water pump disposed in the second bypass channel, wherein
the liquid flowing from the branch to the second bypass channel by an operation of the water pump is introduced to the second piece of equipment.

4. The vehicle heat management system according to claim 3, wherein
in the first mode, the first bypass channel is configured to return the liquid introduced to the second piece of equipment back to the battery temperature regulation circuit, wherein
the battery temperature regulation circuit comprises:
a second control valve provided on a downstream side of the second bypass channel, and
the heat exchanger is provided downstream of the second control valve,
the branch is provided on a downstream side of the heat exchanger, and
in the first mode, by opening the second control valve, the liquid flowing out from the heat exchanger passes through the first bypass channel and is introduced to the second piece of equipment.

5. The vehicle heat management system according to claim 1, wherein
in the second mode, the liquid cooled by the radiator cools the first piece of equipment, and the refrigerant of the refrigerant circuit cools the second piece of equipment.

6. The vehicle heat management system according to claim 5, further comprising:
a second bypass channel configured to return the liquid flowing out from the second piece of equipment back to the battery temperature regulation circuit, wherein
the first control valve is provided between a first coupling of the first bypass channel and the battery temperature regulation circuit, and
the battery temperature regulation circuit comprises:
a second coupling of the second bypass channel and the battery temperature regulation circuit.

7. A vehicle heat management system comprising:
a refrigerant circuit configured to circulate a refrigerant to regulate a temperature inside a passenger compartment of a vehicle therethrough;
a first circuit configured to circulate a liquid and including a radiator;
a first pump provided in the first circuit;
a first heat exchanger provided, in the first circuit, downstream the first pump and upstream the radiator and configured to exchange heat between the liquid and a first piece of equipment for driving the vehicle;
a second circuit configured to circulate the liquid;
a second pump provided in the second circuit;
a second heat exchanger provided in the second circuit and configured to exchange heat between the liquid and the refrigerant;
a third heat exchanger provided in the second circuit and configured to exchange heat between the liquid and a battery;
a control valve provided, in the second circuit, downstream of the third heat exchanger and upstream of the second heat exchanger;
a first three-way valve communicated to a first channel, a second channel and a third channel, the first channel branching from the first circuit at a point downstream of the first pump in the first circuit and upstream of the first heat exchanger in the first circuit, the second channel branching from the second circuit at a point downstream of the third heat exchanger in the second circuit and upstream of the control valve in the second circuit;
a second three-way valve communicated to the third channel, a fourth channel and a fifth channel, the fourth channel branching from the second circuit at a point downstream of the second heat exchanger in the second circuit and upstream of the third heat exchanger in the second circuit;
a third three-way valve communicated to the fifth channel, a sixth channel and a seventh channel, the sixth channel branching from the second circuit at a point downstream of the control valve in the second circuit and upstream of the second heat exchanger in the second circuit, the seventh channel branching from the first circuit at a point downstream of the first heat exchanger in the first circuit and upstream the first pump in the first circuit;
a fourth heat exchanger provided in the third channel and configured to exchange heat between the liquid and a second piece of equipment for driving the vehicle; and
a third pump provided in the fourth channel, wherein
in a first mode,
i) the control valve is opened,
ii) the first three-way valve is switched to a state in which the first three-way valve (1) communicates the second and third channels, and (2) closes off the first channel from the second and third channels, iii) the second three-way valve is switched to a state in which the second three-way valve (1) communicates the third and fourth channels and (2) closes off the fifth channel from the third and fourth channels,
iv) the third three-way valve is switched to a state in which the third three-way valve (1) communicates the fifth and sixth channels, and (2) closes off the seventh channel from the fifth and sixth channels,
v) the second pump is activated, and
vi) the third pump is activated to transfer the liquid in the fourth channel toward the second three-way valve, and in a second mode,
i) the control valve is closed,
ii) the first three-way valve is switched to the state in which the first three-way valve (1) communicates the second and third channels, and (2) closes off the first channel from the second and third channels,
iii) the second three-way valve is switched to a state in which the second three-way valve (1) communicates the third and fifth channels and (2) closes off the fourth channel from the third and fifth channels,
iv) the third three-way valve is switched to the state in which the third three-way valve (1) communicates the fifth and sixth channels, and (2) closes off the seventh channel from the fifth and sixth channels,
v) the second pump is activated, and
vi) the third pump is deactivated.

\* \* \* \* \*